(12) United States Patent
Watanabe et al.

(10) Patent No.: US 6,581,005 B2
(45) Date of Patent: Jun. 17, 2003

(54) VEHICLE POSITION CALCULATION APPARATUS AND METHOD

(75) Inventors: Masaki Watanabe, Kanagawa-ken (JP); Rumi Minakawa, Kanagawa-ken (JP); Hiroshi Saitou, Kanagawa-ken (JP); Okihiko Nakayama, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/987,274

(22) Filed: Nov. 14, 2001

(65) Prior Publication Data

US 2002/0065603 A1 May 30, 2002

(30) Foreign Application Priority Data

Nov. 30, 2000 (JP) .......................... 2000-364745
Dec. 4, 2000 (JP) .......................... 2000-368857

(51) Int. Cl.⁷ .................. G06F 165/00; G06F 17/30
(52) U.S. Cl. .................. 701/210; 701/207; 701/200; 701/117; 340/990; 340/995; 340/988; 702/94; 702/150; 342/357.08
(58) Field of Search .................. 701/207, 208, 701/209, 210, 211, 217, 117, 102, 200, 212; 340/990, 995, 988; 344/988; 702/150, 94, 95

(56) References Cited

U.S. PATENT DOCUMENTS

| | | | | |
|---|---|---|---|---|
| 4,713,767 A | * | 12/1987 | Sato et al. .................. | 340/993 |
| 4,882,689 A | * | 11/1989 | Aoki .......................... | 340/988 |
| 5,442,559 A | * | 8/1995 | Kuwahara et al. .......... | 340/995 |
| 5,552,990 A | * | 9/1996 | Ihara et al. ................. | 340/990 |
| 5,774,824 A | * | 6/1998 | Streit et al. ................. | 701/207 |
| 6,023,653 A | * | 2/2000 | Ichimura et al. ............ | 701/208 |
| 6,249,740 B1 | * | 6/2001 | Ito et al. ..................... | 701/200 |
| 6,421,659 B1 | * | 7/2002 | Nomura ......................... | 707/3 |

FOREIGN PATENT DOCUMENTS

JP     410300492 A   * 11/1998

* cited by examiner

Primary Examiner—Thomas G. Black
Assistant Examiner—Tuan C To

(57) ABSTRACT

A vehicle position calculation apparatus and method are provided to correct a vehicle position to be located on a map route. The vehicle position calculation apparatus has a vehicle position measuring section measuring a vehicle position, a road data supply section supplying road geometrical data including a line segment and a closed region correlated with a road on a map, and a vehicle position correcting section correcting the vehicle position on the map by using the road geometrical data. The position correcting section locates the vehicle position by itself on the map as a corrected vehicle position, in response to a relatively positional relation between the vehicle position and the road geometrical data. In such a correction, the vehicle position correcting section can correct the vehicle position to be in alignment with a point on corresponding one of position correction shapes, or it can correct the vehicle position onto a traveling link generated in response to the road geometrical data.

14 Claims, 18 Drawing Sheets

| RING ID | STARTING POINT COORDINATE VALUE | SERIES LINK | END POINT COORDINATE VALUE | SERIES LINK | OVERLAP POLYGON |
|---|---|---|---|---|---|
| L1 | (N1x,N1y) | (others) | (N2x,N2y) | L2,L3 | R1 |
| L2 | (N2x,N2y) | L3,L1 | (N3x,N3y) | (others) | R1 |
| L3 | (N2x,N2y) | L1,L2 | (N4x,N4y) | (others) | R1 |
| ... | | | | | |

| POLYGON ID | NUMBER OF VERTICES | COORDINATE VALUES OF VERTICES | ENTERING AND EXIT LINKS |
|---|---|---|---|
| R1 | 7 | (R1x,R1y),(R2x,R2y),···,(R7x,R7y) | L1,L2,L3 |
| ... | | | |

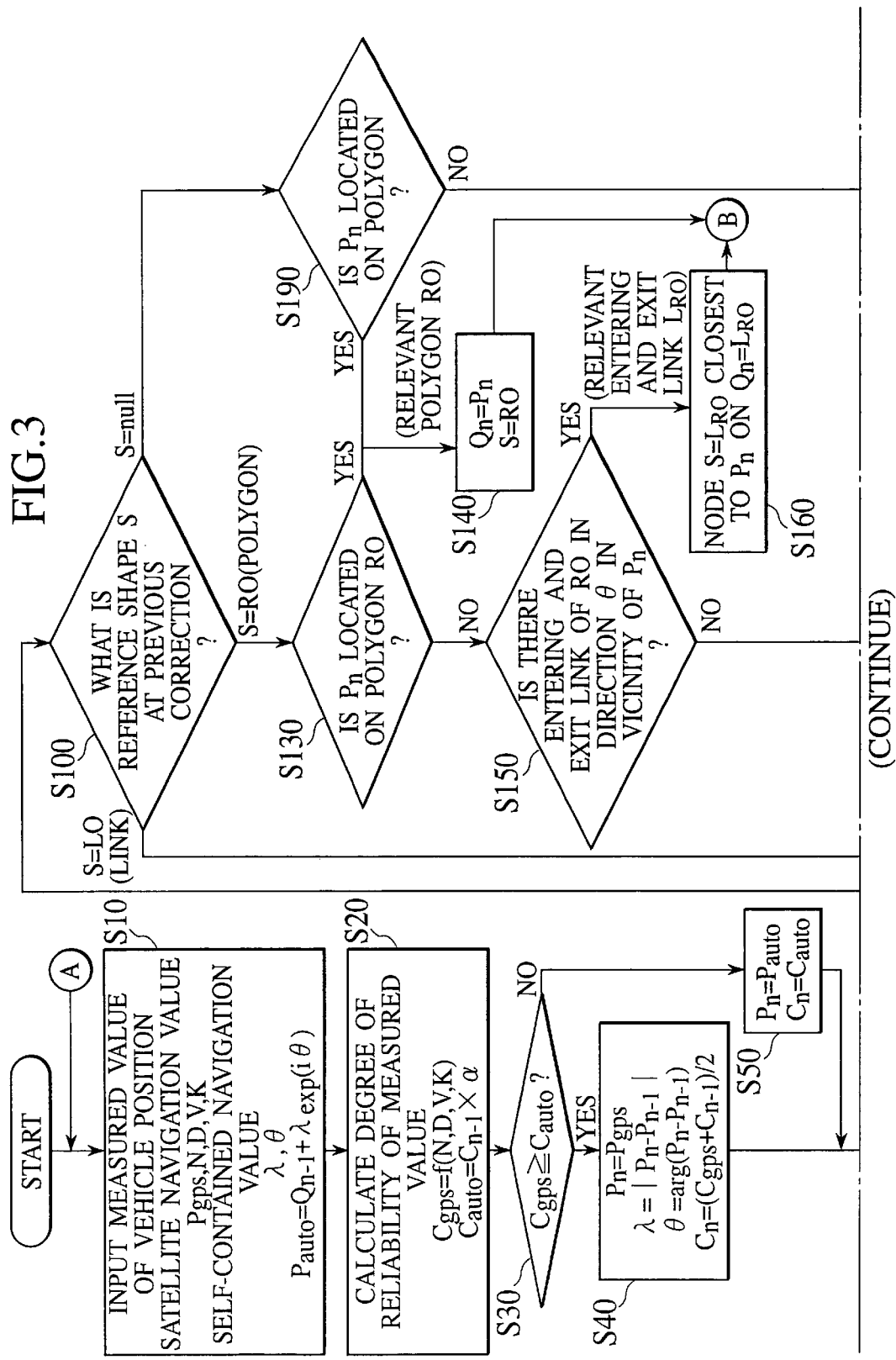

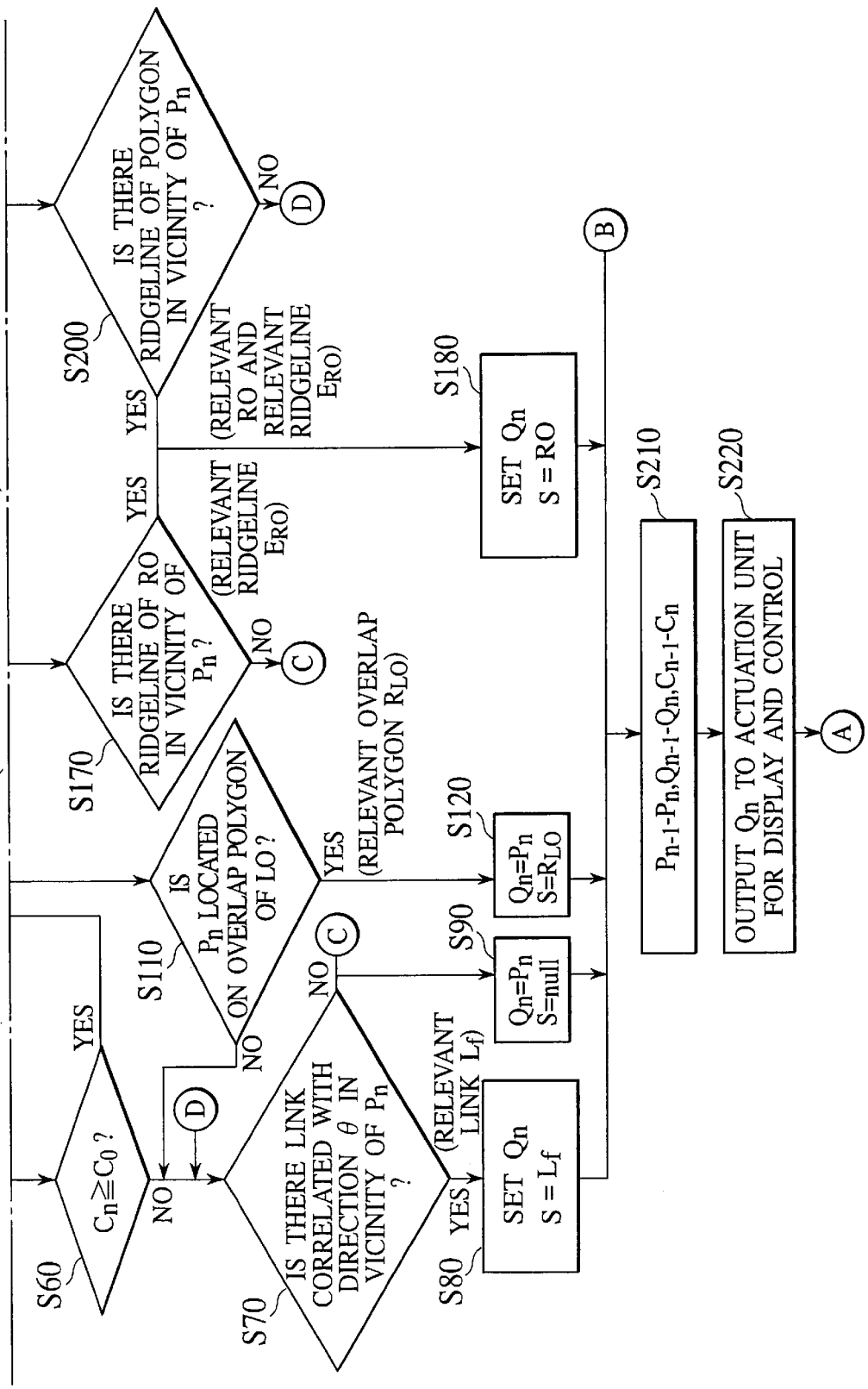

TRAVELING LINK

TRAVERSABLE AREA

VEHICLE POSITION

GUIDED LANE

▨ : POLYGON IN WHICH TRAVELING LINK IS GENERATED IN CASE OF NO GUIDED LANE

☐ : POLYGONS EXCEPT FOR OTHER POLYGONS

LINK  CENTER LINE

NODE
LINK   CENTER LINE

TRAVELING LOCUS   CENTER LINE

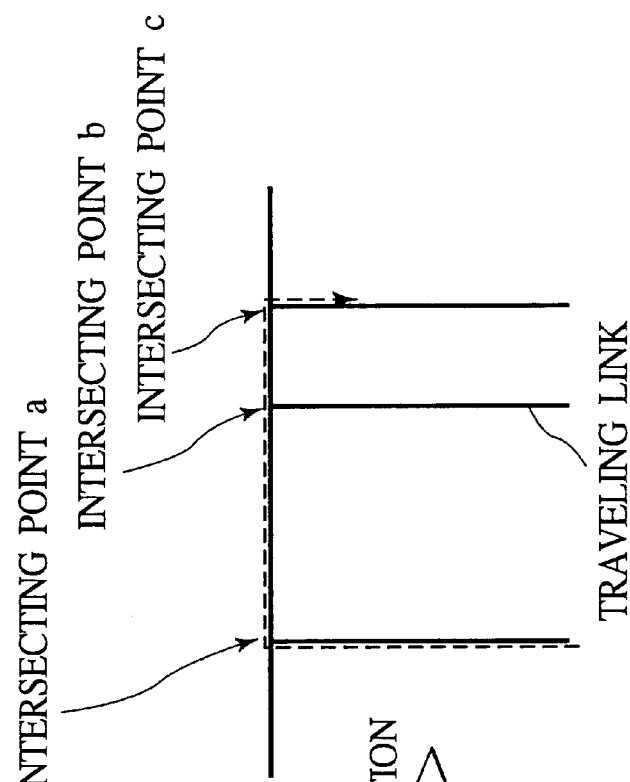
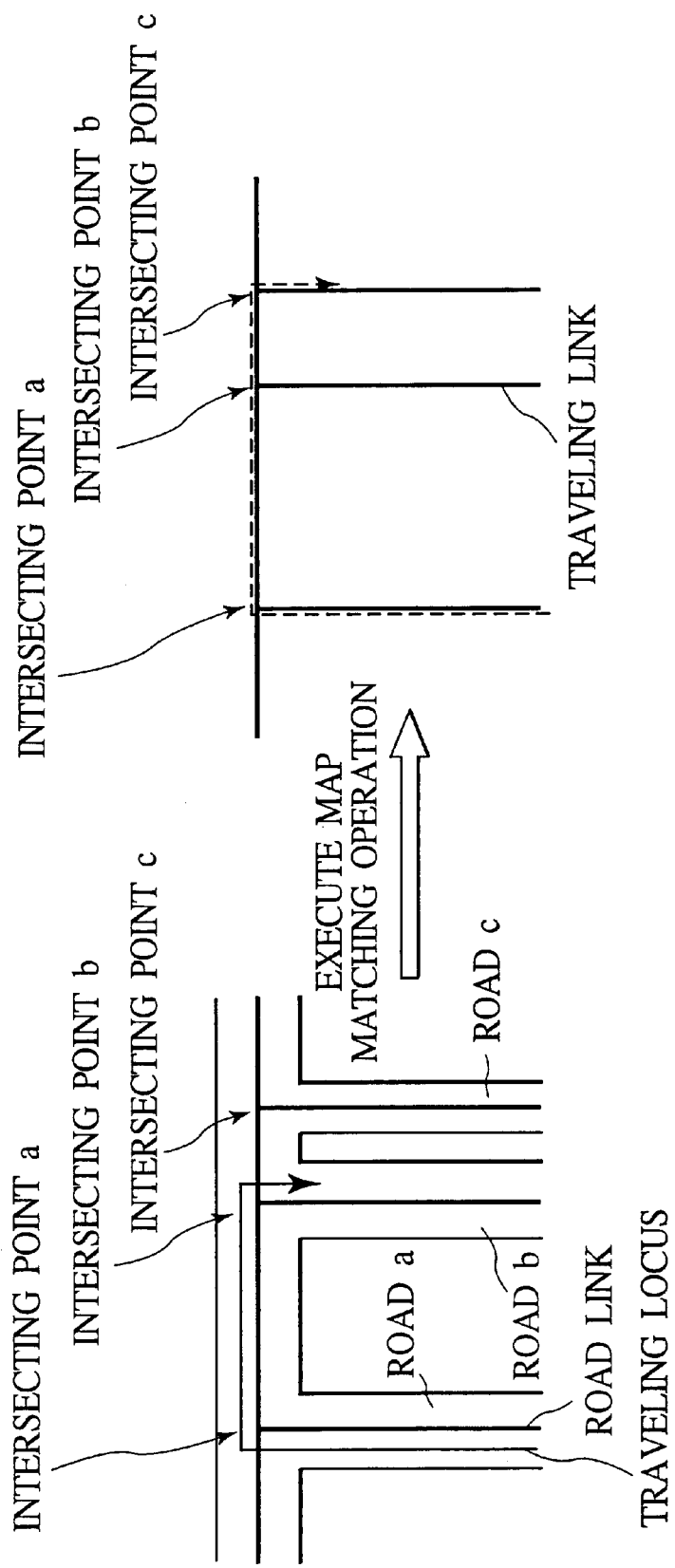
FIG.25A PRIOR ART
FIG.25B PRIOR ART

VEHICLE POSITION CALCULATION APPARATUS AND METHOD

BACKGROUND OF THE INVENTION

The present invention relates to a vehicle position calculation apparatus and method for accurately determining a vehicle position on a map route in a navigation system for a vehicle.

In such a vehicular navigation system, it has been a usual practice to utilize a vehicle position calculation apparatus which employs a map matching technique for calculating a vehicle position to be displayed on a map route.

The map matching technique strictly operates on an assumption in that the vehicle travels on the road. In particular, measuring sensors include a GPS receiver, a gyro sensor and a vehicle speed sensor which provide a vehicle position and a vehicle travel direction. The vehicle position and the vehicle travel direction are compared with a group of line segments, representing a road shape, which are preliminarily stored in a memory section, thereby correcting the vehicle position so as to lye on a particular point on the line segment having the most probable relationship in a position and a direction in conjunction with the measured value.

Firstly, a vehicle position correction method in the related art is described below in detail with reference to a branch road shown in FIG. 22 to exemplify how correction of the vehicle position is performed in the branch road.

In FIG. 22, it is assumed that the branch road B is given as a correction shape for the vehicle position and is constructed of three line segments L1, L2, L3 connected with each other and diverging at a node N. In this respect, it is a usual practice to define a road shape with a plurality of nodes determined at respective positions (with latitude and longitude) and line segments representing a connecting relationship relative to the respective nodes. The road shape thus defined in such a configuration is used for effectuating a map matching operation as will be hereinafter described in detail.

In FIG. 22, points P1 to P7 refer to measured values or measured points of the vehicle position which is measured with the measuring sensors at time instants t1 to t7. Also, points Q1 to Q7 refer to corrected and outputted vehicle positions which are extracted in the vehicle position calculation of the related art. In actual practice, the measured values of the vehicle position are obtained by the measuring sensors to directly provide the coordinate value Pn in an absolute value or to individually provide a vehicle travel direction θn−1, n and a traveled distance λn−1, n in a relative value between associated measuring points.

In the former case, the point Pn which is directly measured is hereinafter referred to as a primary vehicle position. In the latter case, also, assuming that a previous measured value is Pn−1, an absolute coordinate value Pn is given by:

$$Pn = Pn-1 + \lambda n-1, n \; exp(i\theta n-1, n) \quad (1)$$

wherein exp is an index factor and i is an imaginary unit.

The vehicle position thus obtained is hereinafter referred to as a secondary vehicle position.

The primary and secondary vehicle positions are collectively called as a measured value of the vehicle position. Even in the former case, it is possible to calculate back the relative displacement value θn−1, n and λn−1, n from the above equation (1).

Now, at the time instant t1, the measured value P1 of the vehicle position substantially lies on the line segment L1 and, because a previous vehicle travel direction is substantially aligned with a direction of the line segment L1, the measured point P1 and a corrected result Q1 are assumed to lye on the same point.

Next, at the time instant t2, the measured value of the vehicle position has the point P2 which is dislocated from the line segment L1. If, in this instance, there is no line segment, in close proximity to the measured point, for correcting the vehicle position, except for the line segment L1 and the vehicle travel direction Q1, 2 is oriented at an angle within an allowable error range, then, it is assumed that the vehicle travels on the same road as that the vehicle has previously traveled. That is, it is discriminated that the vehicle position at the time instant t2 still lies on the line segment L1. Accordingly, the vehicle position at this time instant is corrected to a point Q2 at which a leg of a vertical line drawing from the point P2 intersects the line segment L1.

Further, at the time instant t3, it is assumed that the point P3 is given as the primary vehicle position, or the vehicle travel direction θ2, 3 and the traveled distance λ2, 3 are obtained between the time interval t2, t3. At the previous time instant t2, the vehicle position is corrected at the point Q2 on the line segment L1. In such a case, assuming that the degree of precision of the relative displacement value is guaranteed to some extent, then, the point P3' is obtained as the secondary vehicle position on the basis of a reference of the previous corrected value as expressed by:

$$P3' = Q2 + \lambda 2,3 \; exp(i\theta 2,3) \quad (2)$$

Here, if the point P3' does not lye on the line segment L1, then, the measured point of the vehicle position is corrected at the point on the line segment L1 in the same manner as that achieved in the previous case. For example, the correction is implemented by drawing the leg of the vertical line from the point P3' to the line segment L1 to output the corrected point Q3 as a final corrected position. At subsequent steps after the time instant t3, similar operations are carried out.

In accordance with the vehicle position calculation method discussed above, as far as a premise satisfies that the vehicle travels on the road, even when the output value of the measuring sensor contains a slight amount of detection error, the detection error is corrected to accurately align the vehicle position with a correct position of the map route in a reliable manner.

Besides, in another related art, it has been proposed that a vehicle position calculation apparatus employs a CD-ROM, which preliminarily stores a plurality of road links with a road being represented with line segments, to enable map matching operation to allow the road links in the vicinity of the vehicle position to be read out from the CD-ROM such that the vehicle position is forced to lye on the road link.

SUMMARY OF THE INVENTION

However, in the first related art discussed above, in a case where the road shape which serves as a ground for correction of the vehicle position is different from an actual road shape, correction of the vehicle position causes a cumulative error, with a resultant output of an erroneous vehicle position.

More particularly, as seen in FIG. 22, an actual road shape has an increased road width in front of a branching point and the vehicle, which tends to travels on the line segment L3, is supposed to be closer to the left side than the line segment L1 fairly in front of the node N during traveling. Such a structure is found in the road which has a lane for deceleration of the vehicles at a location in which an exit road diverges from a main road such as an interchange in highway road.

As a consequence, the measured values P1 to P7 shown in FIG. 22 show a position rather closer to an actual road when the vehicle is going to get out the line segment L3. However, in accordance with the former related art, the map matching technique causes the vehicle position to be corrected with respect to the main road. That is, during the time period between t1 to t5, the respective measured points of the vehicle position are corrected at the corrected points Q1 to Q5 on the line segment L1.

However, at the time instant t6 shown in FIG. 23, even if the measured point P6 is given under a condition that the accuracy of the relative displacement value is guaranteed, the previous correcting position Q5 is used as the reference based on which the secondary vehicle position is extracted at the point P6' which lies on the position in the vehicle travel direction θ5,6 with the traveled distance λ5,6.

Here, the measured point P6' is not aligned with any one of the line segments L1, L2, L3 and, therefore, a further correction is implemented. In such a case, correcting position candidates are located on two points Q6, Q6' of legs of the vertical lines drawn from the point P6' to the line segments L2, L3. Actually, assuming that the vehicle is traveling in a region closer to the left side fairly in front of the time instant t6 with a view to leaving to the exit line segment L3, since a steering angle is varied in a relatively gradual manner, it is deemed that the vehicle travel direction at such a time instant is in a forward direction, i.e. to be closer to a direction along the line segments L1 to L2.

If so, the secondary vehicle position P6' is closer to the point Q6 among the two candidate points, with a resultant correction of the vehicle position onto the point Q6 on the line segment L2 at the time instant t6. Further, at the time instant t7, the measured point P7 is corrected to the point Q7 on the line segment L2 in the similar manner as previously described above.

Thus, in accordance with the vehicle position calculation apparatus in the first related art, the vehicle position, which is deemed to exit from the main road, is inevitably corrected to the point on the main road. Especially, in a Y-shaped road where two diverging roads constitute an acute angle, an issue is encountered in correction of the vehicle position for the same reasons as previously discussed above.

Next, in the second related art discussed above, with such a vehicle position calculation apparatus, the road links stored in the CD-ROM is represented with a single line which passes through a substantially center of the road without distinction of the ups and downs of the road in case of no median strip.

For this reason, when the map matching operation is performed in conjunction with a wide road with a large width, since the vehicle position is forcibly located on the road link located on the central line of the road, the vehicle position is inevitably dislocated from the correct position in fore and aft directions immediately after the vehicle turns to the left or the right.

For example, as shown in FIG. 24A, it is assumed that the vehicle turns to the left at an intersecting point a and, thereafter, goes forward through an intersecting point b to an intersecting point c, at close range from the point b, at which the vehicle further turns to the left at a second time. In such a case, the traveling distance due to actual traveling locus becomes shorter than the distance of the traveling link involving the intersecting points a, b, c. As a result, when performing the map matching operation, the apparatus suffers from an undershooting effect to cause the vehicle position to be wrongly corrected such that the vehicle turns to the left at the intersecting point b shorter in distance than the intersecting point c during actual turning of the vehicle to the left as seen in FIG. 24B.

As seen in FIG. 25A, further, it is assumed that the vehicle turns to the right at the intersecting point a and, thereafter, the vehicle turns to the right at the intersecting point b at the second time. In such a case, the traveling distance due to actual traveling locus becomes longer than the distance of the traveling link involving the intersecting points a, b. As a result, when performing the map matching operation, the apparatus suffers from an overshooting effect to cause the vehicle position to be wrongly corrected such that the vehicle turns to the right at the intersecting point c shorter in distance than the intersecting point b during actual turning of the vehicle to the right as seen in FIG. 25B.

It is therefore an object of the present invention to provide a vehicle position calculation apparatus and a vehicle position calculation method which are able to accurately correct a vehicle position in accordance with an actual road state.

It is another object of the present invention to provide a vehicle position calculation apparatus and a vehicle position calculation method which are able to accurately correct a vehicle position even when a vehicle turns to the left or the right at an intersecting point.

According to a first aspect of the present invention, there is provided a vehicle position calculation apparatus having: a vehicle position measuring section measuring a vehicle position; a road data supply section supplying road geometrical data including a line segment and a closed region correlated with a road on a map; and a vehicle position correcting section correcting the vehicle position on the map by using the road geometrical data. The position correcting section locates the vehicle position by itself on the map as a corrected vehicle position, in response to a relatively positional relation between the vehicle position and the road geometrical data.

Also, in such a structure, the vehicle position correcting section can correct the vehicle position to be in alignment with a point on corresponding one of position correction shapes composed of a group of line segments representing a center of a road and a two-dimensional closed regional shape correlated with a predetermined location.

Still also, in such a structure, the vehicle position correcting section can correct the vehicle position onto a traveling link generated in response to the road geometrical data.

In other words, there is provided a vehicle position calculation apparatus having: measuring means for measuring a vehicle position; supplying means for supplying road geometrical data including a line segment and a closed region correlated with a road on a map; and correcting means for correcting the vehicle position on the map by using the road geometrical data. The correcting means locates the vehicle position by itself on the map as a corrected vehicle position, in response to a relatively positional relation between the vehicle position and the road geometrical data.

According to a second aspect of the present invention, there is provided a vehicle position calculation apparatus having: a vehicle position measuring section measuring a vehicle position; a position correcting shape memory section storing road shape data including position correction shapes composed of a group of line segments representing a center of a road and a two-dimensional closed regional shape correlated with a predetermined location on a map; and a vehicle position correcting section correcting the vehicle position on the map to be in alignment with a point on corresponding one of the position correction shapes stored in the position correcting shape memory section. The vehicle position correcting section includes: a correction reference determination unit determining whether to correct the vehicle position based on a reference of any one of the position correcting shapes stored in the position correcting shape memory section, on the basis of a close proximity or inclusive relationship between the vehicle position and the any one of the position correcting shapes; a line segment conformity position correcting unit correcting the vehicle position so as to allow the vehicle position to be aligned onto a point of the line segment which the correction reference determination unit determines as the reference; and a regional conformity position correcting unit correcting the vehicle position so as to allow the vehicle position to be aligned onto a point inside the closed regional shape or on a point of a contoured line segment of the closed regional shape which the correction reference determination unit determines as the reference.

According to a third aspect of the present invention, there is provided a vehicle position calculation apparatus having: a vehicle position measuring section measuring position information representing a vehicle position and bearing information representing a vehicle travel direction; a road map memory section storing road shape data composed of polygons correlated with a road on a map; an attribute data memory section storing joint attribute data representing traffic regulating information with respect to the road shape data and a joint state information between the road shape data; a map read out section reading out the road shape data in a vicinity of the vehicle position and the joint attribute data from the map read out memory section and the attribute data memory section, respectively, on the basis of the position information; a traveling link generating unit generating a traveling link correlated with the vehicle position in response to the road shape data and the joint attribute data read out by the map read out section, on the basis of the position information and the bearing information; and a vehicle position correcting section responsive to the position information and the bearing information to correct the vehicle position on the map onto the traveling link generated by the traveling link generating unit.

Besides, in the present invention, a vehicle position calculation method measures a vehicle position; supplies road geometrical data including a line segment and a closed region correlated with a road on a map; corrects the vehicle position on the map by using the road geometrical data; and locates the vehicle position by itself on the map as a corrected vehicle position, in response to a relatively positional relation between the vehicle position and the road geometrical data.

Other and further features, advantages, and benefits of the present invention will become more apparent from the following description taken in conjunction with the following drawings.

BRIEF DESCRIPTION OF THE DRAWINGS

FIG. 3 is a flow chart illustrating the basic sequence of operational steps of the vehicle position calculation apparatus shown in FIG. 1 to carry out a vehicle position calculation method according to the present embodiment;

FIG. 25A is a schematic view illustrating how the vehicle turns to the right at the intersecting point b at a second time immediately after the vehicle has turned to the right at the intersecting point a in the second related art; and FIG. 25B is a schematic view illustrating how the overshooting phenomenon is generated in the vehicle position calculation apparatus in the second related art.

DETAILED DESCRIPTION OF THE PREFERRED EMBODIMENTS

To describe the present invention more in detail, a vehicle position calculation apparatus of several embodiments of the present invention to carry out a method of the present invention will be explained below with reference to the accompanied drawings.

Figure 1:
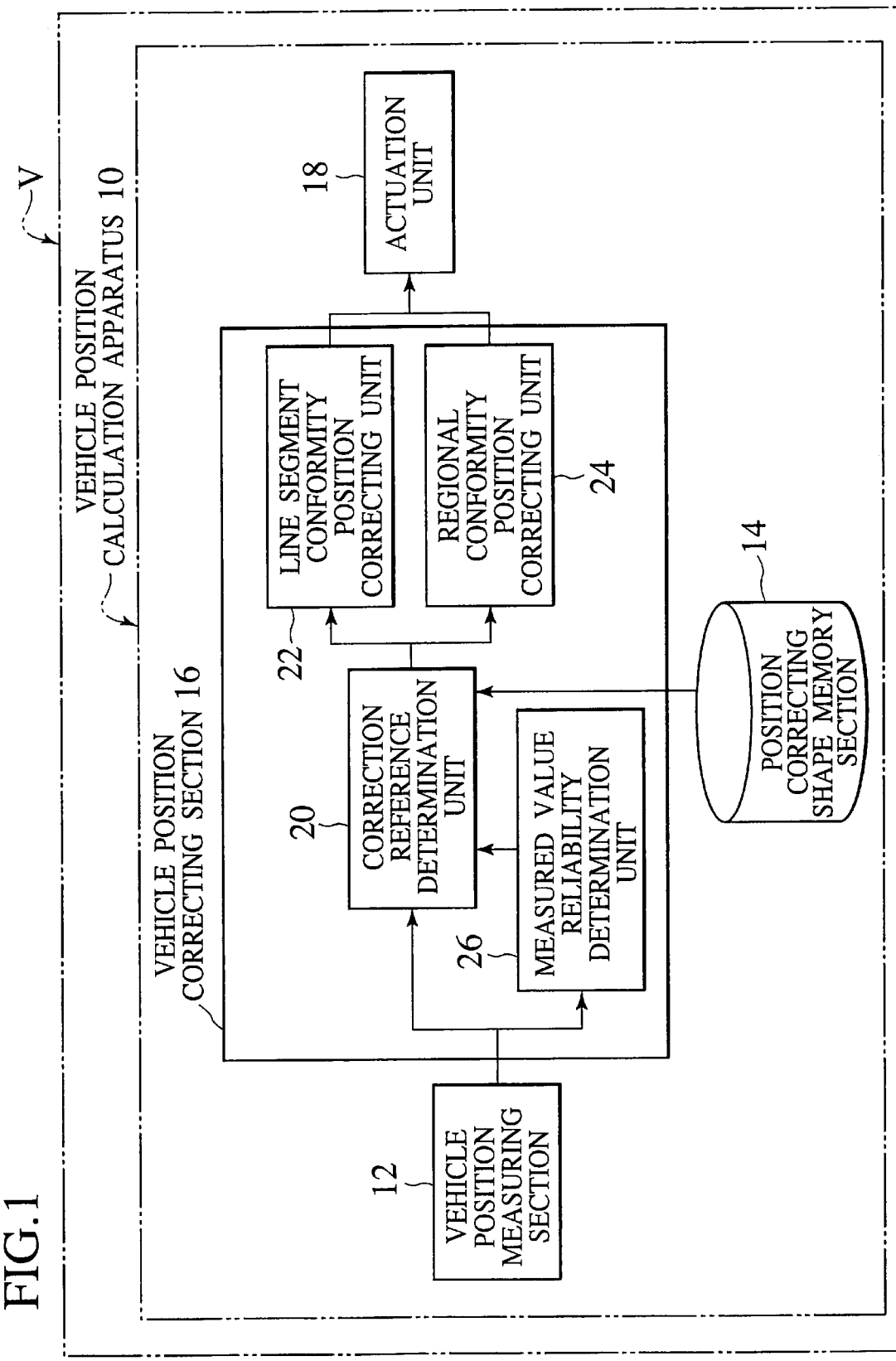
FIG. 1 is a block diagram of a vehicle position calculation apparatus of a first embodiment according to the present invention.

Referring to FIG. 1, there is shown a block diagram of an overview of a vehicle position calculation apparatus 10 of a first embodiment according to the present invention. The vehicle position calculation apparatus 10 is applied to a vehicle V such as an automobile and constructed of a vehicle position measuring section 12, a position correcting shape memory section 14 and a vehicle position correcting section 16 which produces a calculated vehicle position which is outputted to an actuation unit 18.

In particular, the vehicle position measuring section 12 is constructed of measuring sensors such as a GPS sensor, a gyro sensor and a vehicle speed sensor. That is, the vehicle position measuring section 12 includes a composite type measuring section which is arranged to measure a current vehicle position on the basis of time information received by a plurality of GPS satellites and the current vehicle position is suitably corrected in response to outputs of the gyro sensor and the vehicle speed sensor. In this manner, the composite type measuring section measures the vehicle position and a travel direction to obtain a measured values as a vehicle state characteristic. Thus, the vehicle position measuring section serves as a sensor section to measure vehicle state characteristics involving the vehicle position, etc.

The position correcting shape memory section 14 is connected to the vehicle position correcting section 16, and includes a computer readable record medium, such as a CD-ROM, and a drive mechanism which reads out a memory content of the record medium. The record medium stores therein road shape data, including a geometric shape involving series-connected nodes intersecting more than three roads, sinuous roads and large area facilities, etc., which serve as a correction reference based on which the vehicle position is corrected. Thus, the position correcting shape memory section 14 serves as a road shape data supply section for supplying road shape data and reads out the geometric shape on a map route to be transmitted to the vehicle position correcting section 16.

The vehicle position correcting section 16 is composed of a computer which includes an internal memory that stores a control program, and a CPU which executes the control program such that the measured vehicle position is corrected with reference to a position correcting shape.

The actuation unit 18 is constructed of a monitor for displaying the vehicle position on the map route, an actuator for carrying out various vehicle controls, and a computer for suitably processing a given vehicle position in accordance with a process for utilizing the given vehicle position. Thus, the actuation unit 18 is widely termed to refer to these general actuations.

Further, the vehicle position correcting section 16 includes a software module composed of a correction reference determination unit 20, a line segment conformity position correcting unit 22, a regional conformity position correcting unit 24 and a measured value reliability determination unit 26.

Figures 2A, 2B, 2C:
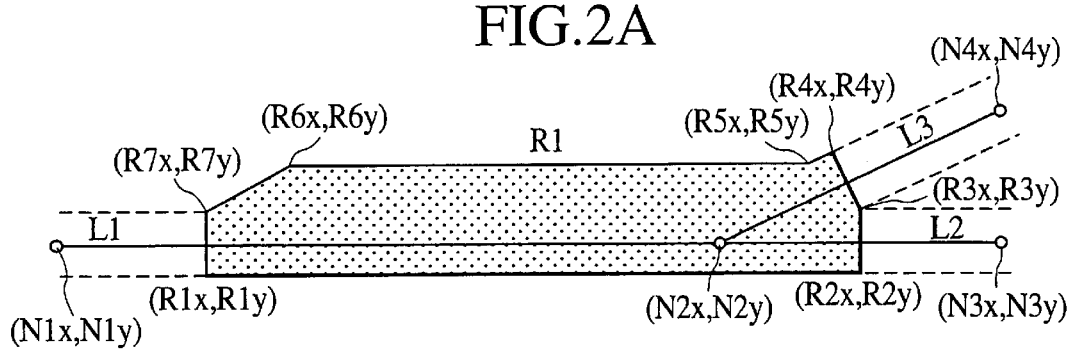
FIG. 2A is a view illustrating a position correcting shape to be used as a correcting reference in the vehicle position calculation apparatus shown in FIG. 1.
FIG. 2B is a table illustrating items of the position correcting shape to be stored in conjunction with traveling links and overlap polygons sown in FIG. 2A.
FIG. 2C is a table of items to be stored for the polygons sown in FIG. 2A.

More particularly, the position correcting shape memory section 14 stores the geometric shape, as shown in FIG. 2A, which contains line segments and a closed regional area correlated with a predetermined location such as the branch road, the sinuous road and the large area facility, etc. that serve as the correction reference of the vehicle position, in a fashion as shown in FIGS. 2B and 2C.

Here, the line segment represents a central road segment and is referred to as a link. Further, the closed area may be composed of a circular shape including a center point and a radius. In the first embodiment, the closed area is represented with a polygonal shape and is hereinafter referred to as a polygon.

Individual links and polygons are given with IDs to be individually discriminated from one another. More particularly, the link has a position coordinate representing respective nodes each corresponding to a start point and an end point, and has the node connected to other links with IDs, respectively. Also, in a case where a particular polygon overlaps the links, an overlap polygon is described with a particular ID. There are some instances where a particular link has a particular start point and a particular end point which two polygons overlap in the vicinities of the particular start point and the particular end point. Thus, plural polygons exist for one link. However, these polygons are so determined as not to include portions which overlap one another.

The polygon is described with the number of vertices with respective position coordinates, and the IDs of the particular links, having an entry and leaving relationship with the polygon, as entry and leaving links. Here, the link involved in the entry and leaving relationship is referred to a link that has a portion which overlaps the polygon and that an entire part is not fully contained in the polygon. Thus, a particular links is defined as the entry and leaving link only in a case where the particular link of which either one of the start point and the end point is contained in the polygon has a remaining portion appearing outside the polygon, or in a case where, although both the start point and the end point of the particular link remain inside the polygon, an intermediate part of the particular link remains outside the polygon owing to a particular concave polygonal shape of the polygon. Also, the link which is fully contained in the polygon is not treated as the entry and leaving link and, in this case, the polygon which fully covers the particular link is defined as an overlap polygon.

FIG. 3 is a flow chart of the basic sequence of operational steps for the vehicle position calculation apparatus 10 shown in FIG. 1 to carry out a vehicle position calculation method according to the present embodiment. In the flow chart shown in FIG. 3, the basic sequence covers the operational steps starting from an initial step for inputting the measured vehicle position and ending with a step for outputting the corrected vehicle position, with the basic sequence being repeatedly implemented each time the measured vehicle position is applied from the vehicle position measuring section 12 to the vehicle position correcting section 16.

At step S10, the measured values, at time instant tn, of the vehicle position are applied to the vehicle position correcting section 16 from the vehicle position measuring section 12. In the present embodiment, the measured vehicle positions are extracted from the vehicle position measuring section 12 on the basis of the satellite navigation technique using the GPS sensor and the autonomous navigation technique using the gyro sensor and the vehicle speed sensor, respectively, and subsequently a final measured value Pn is determined at the time instant tn in accordance with a reliability of the respective navigation techniques. In the satellite navigation technique, the measured values, i.e. the latitude and the longitude are applied as a primary vehicle position Pgps.

Concurrently, as parameters that represent navigation states, the vehicle position measuring section 12 applies characteristics such as the number N of associated satellites, a DOP value D, a vehicle speed V and the number K of continuous measuring sequences of the GPS satellites to the vehicle position correcting section 16. Also, in conjunction with the autonomous navigation technique, the measured values of the gyro sensor and the vehicle speed sensor are added during a time interval between a previous measuring time instant tn−1 and a subsequent time instant tn, thereby calibrating a vehicle travel distance λ and a vehicle travel direction θ. Then, a calculation is made to obtain a corrected value Qn−1 at the previous measuring time instant tn−1 as a reference value to which a deviation vector λexp(iθ) is added, extracting a position as a secondary vehicle position Pauto in the autmonous navigation technique. The previously measured vehicle position Qn−1 is employed as the reference in order to extract the secondary vehicle position at a higher accurate level than that using the measured value Pn−1, for thereby overcoming a degraded navigation reliability encountered in the autonomous navigation technique. In an event that the satellite navigation technique is inoperative and the primary vehicle position Pgps is not extracted, the secondary vehicle position Pauto is applied to the vehicle position correcting section 16 from the vehicle position measuring section 12 for given time intervals.

In the next step S20, the measured value reliability determination unit 26 determines the degree of reliability of the measured values (involving the measured values obtained by the satellite navigation technique and the autonomous navigation technique). First, the measured value reliability determination unit 26 determines the degree Cgps of a reliability of the measured value Pgps of the satellite navigation technique on the basis of the parameter values N, D, V and K. As the number of the satellites trapped by the vehicle increases, the DOP value decreases, the traveling speed increases and the number of consecutive measuring sequences increases, the level of the GPS navigation accuracy tends to increase. The contribution ratios of respective items FN, FD, FV and FK in terms of the degree Cgps of reliability are preliminarily determined as, for example in conjunction with the number of the associated satellites, the value FN=1 when N≧4, the value FN=0.9 when N=3 and the value FN=0.9 and the value FN=0 when N≦2, and the degree Cgps of reliability may be determined by a formula:

$$Cgps = FN \times FD \times FV \times FK \tag{3}$$

In such a formula, if the respective contribution ratios are determined with a range [0, 1], the degree of reliability takes a value of a real number in a range between 0 and 1. In case of the absence of the measured value Pgps (i.e. in case of the presence of only the measured value Pauto), it is convenient for Cgps=0. It is to be noted here that the definition of the degree of reliability is not limited to the above form but may take any other suitable form.

In the autnomous navigation technology, further, since the measured value Pauto is determined on the basis of the result at the previous measuring time instant tn−1, it is natural to think that the degree Cauto of reliability depends on the degree Cn−1 of reliability which is determined at the previous measuring time instant tn−1. Since, further, the autonomous navigation technology is carried out in an adding calculation mode, a continuous measurement causes a cumulative error, thereby degrading the degree of reliability.

Thus, in the present embodiment, the degree Cauto is determined by:

$$Cauto = Cn-1 \times 0.9 \tag{4}$$

In the following consecutive steps S30 to S50, it is determined whether to adopt either one of the measured values, extracted in the aforementioned two calibration processes, as the measured value Pn of the vehicle position.

That is, in step S30, the two degrees Cgps and Cauto are compared and, when Cgps≧Cauto, the measured value extracted in the satellite navigation technique is adopted, while advancing the operation to step S40 wherein Pn=Pgps.

Further, it is preferable to obtain the traveled distance λ and the vehicle travel direction θ as relative displacement values starting from the previous measuring time instant tn−1 by using a differential vector formula Pn−Pn−1. In case of the satellite navigation technology, since the relative displacement values are obtained in a secondary fashion, a difference in the same measured values is used for the calculation conformity. Though it may be possible to use the degree Cgps of reliability as the degree Cn of reliability in the measured value, upon consideration in that the traveled distance A and the vehicle travel direction θ are affected with the previously measured value Pn−1, the degree Cn of reliability is calculated in a formula:

$$Cn = (Cgps + Cn-1)/2 \tag{5}$$

In step S30, when Cgps<Cauto, the measured value obtained in the autonomous navigation technique is adopted and in step S50, the equations read as Pn=Pauto and the degree of reliability reads as Cn=Cauto.

Thus, by determining the degrees of reliability in the plural measured values depending on different measuring techniques and selecting the degree of reliability with the highest accuracy to be an object to be corrected, it is possible to correct the measured vehicle position in a more accurate manner with a compromise between the satellite navigation technology employing the GPS sensor and the autonomous navigation technology employing the gyro sensor and the vehicle sensor.

In consecutive step S60 and in subsequent steps, the measured value Pn that has been determined in previous stages is processed on the basis of the position correcting shape to extract the correction factor Qn.

First, in step S60, a comparison is implemented between a predetermined reference value Co and the degree Cn of reliability of the measured value Pn given in the previous measured value. In a case where, for example, the satellite navigation technique encounters a deteriorated measuring condition and the autonomous navigation technique continues to produce the measured value Pn (i.e. Pauto), it is estimated that the measuring error is inherently accumulated and it is not suitable for the measured value Pn by itself, which has the most probability to be used as the correction value Qn in the polygon, to be applied to the map matching process. Thus, in such a case, the correction of the measured vehicle position is implemented based on a reference using the link in a manner as carried out, for example, in the state-of-the-art practice. With such an arrangement, it is possible to avoid degradation of a location accuracy of the vehicle position to a lower value than that obtained in the state-of-the-art practice.

In case of Cn<Co, in step S70, a search is conducted to find out a particular link that remains in close proximity to the measured value Pn and has an extending direction which is deemed to approximately coincide with the vehicle travel direction θ with the particular link bearing a symbol Lf.

Here, the term "approximately" means that, upon consideration of a probable error contained in the vehicle speed direction θ, a discrimination of coincidence is implemented with a slight amount of tolerance. A search for the particular link may be conducted in a limited range for the closest link of a particular shape, which has been matched in the previous measuring step, i.e. the series connected link and the entry and leaving link, provided that the measured value Pn is not extremely separated from the previously outputted vehicle position Qn−1. When the particular link Lf has been found out, in step S80, the end of the vertical line describing from the measured value Pn to the particular link LF is interrupted and the value Lf is used as the correction value Qn. In order to select one of the processes in a next stage measuring instant tn+1 depending on whichever link shape is taken for correction at present time, a reference shape S to be used for correcting the vehicle position is stored each time the correction is implemented and is set to the link Lf.

Thus, in a case where the degree Cn of reliability of the measured value of the vehicle position is determined and if the reliability degree is below a given reference level, it is determined that the correction process does not rely on the shape of the closed area and the measured value of the vehicle position is corrected by referring to the line segment. If, in this instance, it is estimated that a difficult is encountered in reliably correcting the vehicle position in the closed area owing to a temporary drop in the wave reception accuracy of the GPS sensor, adoption of the technique for correcting the vehicle position along the line segment enables the correction accuracy of the vehicle position to be avoided from being degraded to a lower value than that attained in the state-of-the-art practice.

If such a link is not found, it is discriminated that there is no relevant correction reference shape. Thus, in step S90, the measured value Pn by itself is applied as the correction value Qn and the reference shape S is set to "null". Incidentally, it will thus be seen that the aforementioned steps S70 to S90 allow another map matching process, for example, to be performed in a similar situation in the state-of-the-art practice. Next, when Cn≧Co in step S60, a search is conducted in step S100 to find the reference shape S that has been used for correcting the vehicle position at the previous time instant tn−1. Subsequent operational steps depend on whether the reference shape S belongs to (a) the link, (b) the polygon or (c) the absence wherein the reference shape does not depend on any correction shape and the measured value Pn−1 by itself is outputted as the value Qn−1. Thus, in a stage of the aforementioned correcting step for the vehicle position, the reference shape S is assigned with the ID numbers of the link, wherein the value Qn−1 is actually involved, and the polygon in case of (a) and (b), and with "null" representative of the absence of the reference shape in case of (c).

When the reference shape S is represented with the link Lo, the operation goes to step S110 to conduct search for whole overlap polygons relevant to the link Lo in the position correcting shape memory section 14 (see FIG. 1) for thereby discriminating whether the previously given measured value Pn rides on internal parts or contoured lines of these overlap polygons. If the measured value Pn lies on the polygon and such value is discriminated to be a reliable result, basically, the vehicle position may take any point on the polygon.

When the polygon is represented with RL0, the operation goes to step S120, and the measured value Pn by itself, which lies on RL0, is given as the correction value Qn. Also, the measured value Pn is treated as the correction value Qn lying on RL0 for a convenience and the position correcting reference shape S is set to the value RL0. In step S110, if the measured value Pn does not lye on the link L0 of any overlap polygon, the correction of the vehicle position is performed by executing the map matching process along the link as performed, for example, in the state-of-the-art practice, implementing the process according to the steps S70 to S90.

Consecutively, the operation is executed in step S100 when the previous position correcting reference shape S lies in the polygon R0 and is described below in detail.

First, in step S130, it is discriminated whether the present measured value Pn still lies on the polygon R0. When the present measured value Pn is found to lye on the polygon R0, the measured value is utilized as the correction value like in the step S120 to provide a condition Qn=Pn in step S140. However, in such a case, the position correcting reference shape S is treated as S=R0 unlike the step S120.

When, further, the measured value is not involved in the polygon R0, the operation goes to step S150 and, then, a search is conducted in the enter and exit links of the polygon R0 to find out a link closest to the measured value Pn which has the extending direction that approximately coincides with the vehicle travel direction θ and when such a link remains in an area within a given distance from the measured value Pn, the link is expressed as LR0. In step S160, further, the leg of the vertical line described from the measured value Pn to the link LR0 is extracted, and this is corrected as the correction value Qn. Thus, the reference shape S for correcting the vehicle position is set to the link LR0.

When a difficulty is encountered in finding out the enter and exit link of the polygon R0 which is close to the measured value Pn in step S150, a search is conducted in step S170 to find out a most provable line segment closest to the measured value Pn from the respective contoured line segments of the polygon R0. Here, the term "contoured line segment" of the particular polygon R0 refers to a line segment intersecting two adjacent vertices of the particular polygon R0. In this case, the contoured line segment does not care whether the extending direction of the contoured line segment succeeds to coincide with the vehicle travel direction θ or fails. When the contoured line segment is found to remain in the area within a given distance from the measured value Pn, it is discriminated that a polygon ER0 exists. In step S180, further, a search is conducted to obtain a particular point on the polygon ER0 that is closest to the measured value Pn, thereby allowing the particular point to be designated as the correction value Qn.

In this instance, also, the reference shape S for the correction of the vehicle position is defined by the polygon R0. In an event that the vehicle position tends to be dislocated from the polygon correction, the above operation allows the vehicle position to be gradually bounded within the polygon. Also, in a case where a difficulty is encountered in finding out the vehicle position close to the measured value Pn within the contoured line segments of the polygon R0, it is discriminated that there is no relevant correcting reference shape, and the operation goes to the step S90, i.e. Qn=Pn and S=null.

Lastly, the operation is executed in step S100 when there is no relevant previous position correcting reference shape S, i.e. in the "null" state, and is described below in detail.

First, a search is conducted to find out whether the measured value Pn extracted in step S190 lies on the polygon. Here, the polygon to be conducted for search may me limited to those which remain in an area within a given range from the measured value Pn. In a case where the measured value Pn lies in a certain polygon, then, the position correcting reference shape S is based on the relevant polygon R0, and a similar process is implemented like in previous step S140.

That is, the measured value Pn by itself is output as the correction value Qn, and the value R0 is used as the correcting reference shape S. Further, in a case where the measured value Pn does not lye on any of the polygons, it is discriminated whether there is a contoured line segment, of the particular segment, closer to the measured value Pn in step S200. When it is found that the measured value Pn remains in the area within the given distance from the closest contoured line segment of the relevant polygon, the relevant polygon having the closest contoured line segment is designated at R0, while the relevant contoured line segment ER0 is regarded as the correction value Qn and provides the relation S=R0. If the measured value Pn has no surrounding or closer relationship with any of the polygons, then, the map matching operation is executed based on the reference of the link in the state-of-the-art practice and the operation returns to step S70 and subsequent steps.

As previously noted above, a reasonable correcting shape within which the measured value Pn is corrected at a point to obtain the correction value Qn is found and the correcting shape is held to have the value S. Subsequently, in step S210, the respective values Pn, Qn and Cn, which have been determined at the time instant tn are kept as Pn−1, Qn−1 and Cn−1, respectively, for the subsequent correcting operation of the vehicle position.

In step S220, further, the vehicle position Qn is finally outputted to the actuation unit 18 in which the vehicle position Qn is suitably processed to be displayed over the map route to display the vehicle position or to be used for the vehicle control. Thereafter, when receiving the parameters Pgps and Pauto, etc., as the measured values of the vehicle position again, the operation will be repeated from the step S10.

Now, a detailed description will be given below with reference to an actual application to clarify how the measured value of the vehicle position is actually corrected.

Figure 4:
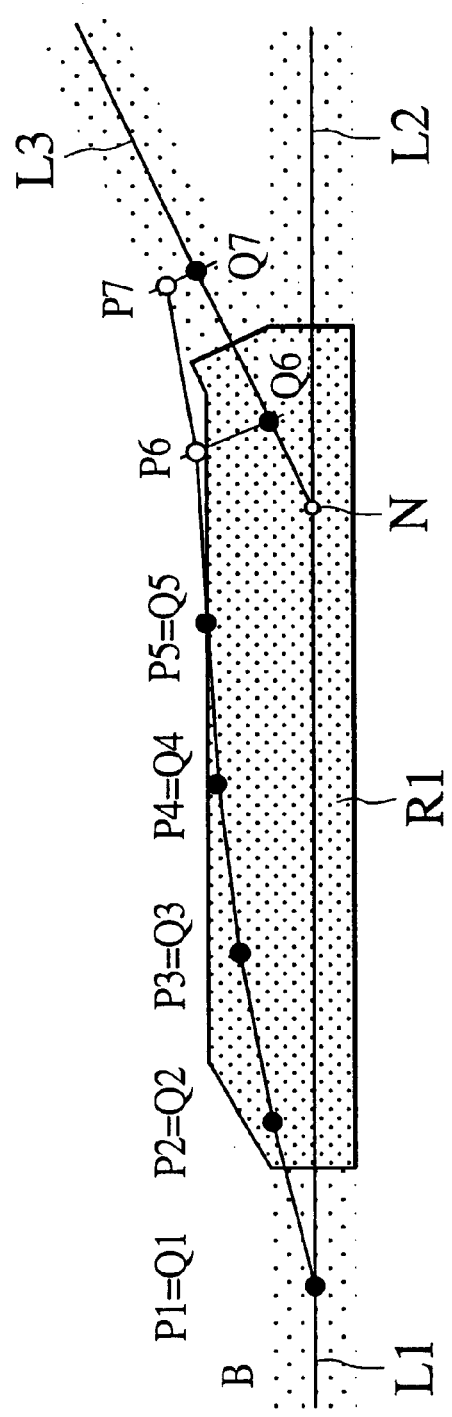
FIG. 4 is a schematic view illustrating how a vehicle position is corrected in conjunction with a road shape with branch roads diverging from a node by using an associated polygon according to the present embodiment.

FIG. 4 is a schematic view illustrating how the measured value of the vehicle position is corrected in a Y-shaped branch road by using the polygon R1 as the correcting reference shape. It is assumed that all of the measured values of the vehicle positions are obtained with a sufficiently high degree Cn of reliability by the satellite navigation technique and that the discrimination reference Cn≧Co in step S60 is satisfied.

First, the measured value P1 is corrected to the value Qn on the link L1. Subsequently, the measured point P2 is bounded within the polygon R1. Since, in this instance, the previous correcting shape takes the form of the link L1, the operation returns to step S100 to step S110. The correcting shapes R1 and L1 form the overlap polygon and the operation goes to step S120 such that the correction value Q2 has the same level as the P2 in conclusion. In the subsequent steps, if the measured values P3, P4 and P5 are bounded within the polygon R1, then, the operation goes to step S100 and step S130 and step S140 wherein the measured values by themslves are outputted as the correction values, respectively. Further, when the measured value P6 is out of the polygon R1, the discrimination in step S130 is regarded as NO and the operation goes to step S150. Among the exit links L2 and L3 which diverge from the node N of the link L1, the link L3 is discriminated as the closest link relevant to the measured point P6 and is selected as the relevant correcting shape.

In step S160, also, the point Q6 is obtained on the closest link L3 as the closest point and is outputted as the correction value. In an event that the subsequent measured value P7 is obtained, the previous correcting shape is the link and the measured value P6 is out of the polygon R1. Under such a condition, the operation in steps subsequent to step S70 is implemented to perform map matching operation in the state-of-the-art practice such that the measured value P7 is corrected to the corrected value Q7 on the link L3. It will thus be seen that, in accordance with the first embodiment, when exiting the polygon R1, the relevant link L3 which has the closest distance to the measured point Pn is adopted as the correcting shape for reliably correcting the measured value Pn of the vehicle position.

Thus, in a case where the vehicle position corrected at a certain time instant lies in either the internal part of the closed area shape or lies on the contoured line segments of the closed area shape and the measured value of the vehicle position obtained at the subsequent time instant remains out of the closed area shape, the relevant line segment is selected from the plural enter or exit line segments, diverging from the node remaining in the closed area shape on the basis of whether the relevant link is closest to the measured value, as the relevant correcting shape. In the absence of any line segments (i.e. road segments) closest to the measured values of the vehicle positions, the relevant closed area shape is selected as the reference for correcting the vehicle position. With such a unique process, especially when the vehicle is getting out of the closed area, the correction of the vehicle position on the road can be accurately implemented in a reliable manner.

In addition, by arranging the position correcting shape memory section 14 such that it stores a road external shape, in the vicinity of the node connected to the more than three branch roads, as the closed regional shape that serves as the position correcting shape, it is possible to discriminate that the vehicle travels on any road with the higher level of accuracy to achieve the correction of the vehicle position in a highly reliable manner especially for the branch roads having more than three connected road segments.

Figure 5:
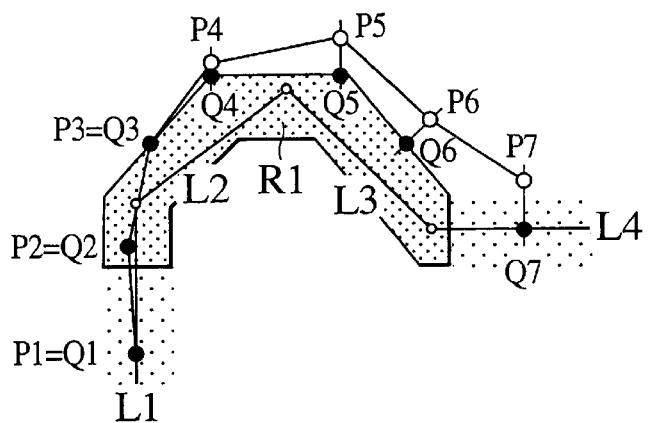
FIG. 5 is a schematic view illustrating how the vehicle position is corrected at a sinuous road on the basis of the associated polygon according to the present embodiment.

FIG. 5 is a view illustrating how the vehicle position is corrected on the basis of the correcting reference composed of the polygon in a curved road with a large radius of curvature. In such an application, it is not guaranteed in that the links to be employed in the state-of-the-art map matching operation are necessarily defined in a strict manner along the road shapes, and, like the links L1 to L4 as shown in FIG. 5, there is some instances where the extending directions of the links are partly different from an actual road shape. Under such a condition, if the measured values P1 to P7 of the vehicle position are individually applied, during the travel of the vehicle from the measured value P4 to P5, the relevant vehicle travel direction is caused to be remarkably different from that of the link L3 which the correction step needs to rely on. When this occurs, the correction of the measured value of the vehicle position relative to the link L3 is not achieved, causing a difficulty for continuing a subsequent correction of the vehicle position. Even in such a case, according to the first embodiment, the vehicle position is enabled to be correlated with the link L3 to achieve correction of the vehicle position along the actual road shape in a highly reliable manner.

More particularly, up to the measured value P3 of the vehicle position, the measured value by itself is outputted as the correction value in the similar manner discussed above. During subsequent travel of the vehicle, the measured values P4, P5 and P6 are dislocated from the contoured line segments of the polygon RI. That is, the measured values P4, P5 and P6 remain outside the polygon R1, and a dislocating state of these measured values from the polygon R1 is confirmed in step S130. Subsequently, in step S150, it is discriminated whether the measured values are closer to the entering and exit links L1, L4. Since, in this instance, the links L2, L3 are fully contained in the polygon R1 and do not serve as the entering and exit links, the links L2, L3 do not serve as candidates for the correcting reference shape in the present step. After all, since the links L1, L4 are not sufficiently close to the measured values P4, P5, P6 (in other word, the vehicle travel directions are generally out of phase from the extending directions of the links, or the legs of the vertical lines drawn from the respective measured points to the respective relevant links are not obtained on the respective relevant links), the operation goes to step S170 and subsequently to step S180, thereby selecting the correction points Q4, Q5, Q6 lying on the contoured line segments, of the polygon R1, which are discriminated to be closest to the measured points P4, P5, P6, respectively. Further, when the travels in an area outside the polygon R1, it is discriminated that the entering and exit link L4 is correlated with the measured point P7, and, in steps S150, S160, the correction point Q7 is obtained at an intersecting point between the leg of the vertical line drawn from the measured point P7 and the relevant entering and exit link L4 which serves as the correcting reference shape.

Thus, by arranging the position correcting shape memory section 14 such that it stores road shape data composed of the position correcting shape defined with the closed regional shape correlated with the vicinity of the sinuous road, it is possible for the measured points of the vehicle position in the vicinity of the sinuous road with a large radius of curvature to be pertinently corrected in a highly reliable manner.

Figure 6:
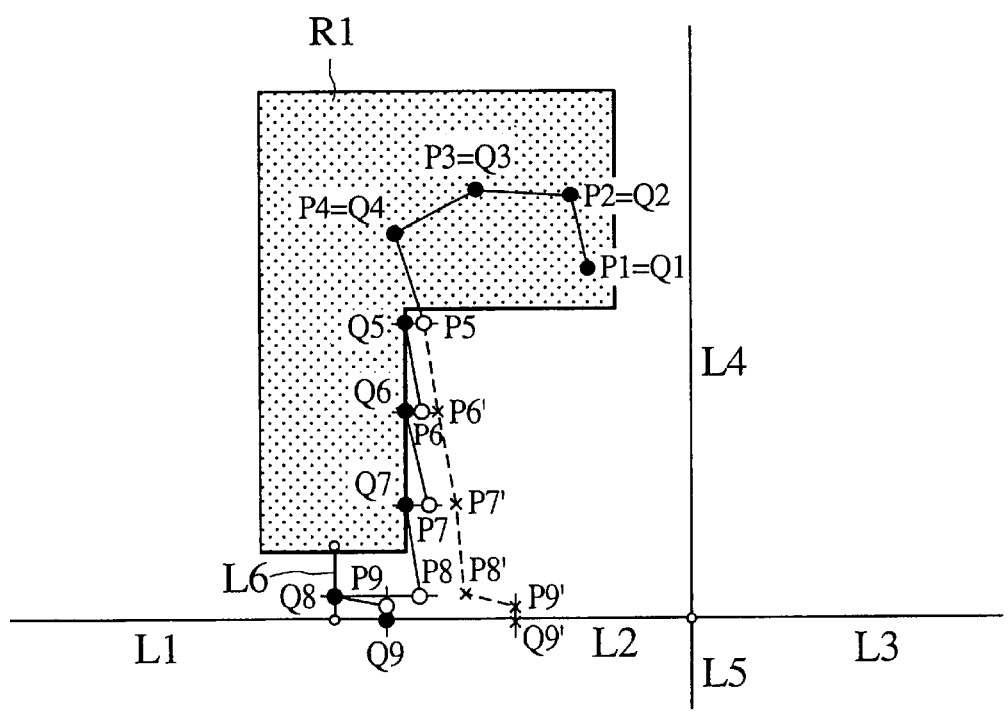
FIG. 6 is a schematic view illustrating how the vehicle position is corrected at a large area facility on the basis of the associated polygon according to the present embodiment.

FIG. 6 is a view illustrating how the vehicle position is corrected on the map route, in the first embodiment, when the vehicle position is associated with a facility polygon R1 in the large facility area extending from the existing link which serves as the connecting road link L6. It is assumed that the individual measured values Pn of the vehicle positions are extracted in the autonomous navigation technique and a selected in step S30. If these measured values of the vehicle positions are extracted in the satellite navigation technique and is these measured values seems to satisfy a reference level of the degree of reliability required by the step S60, it is possible for the vehicle speed to be accurately corrected by carrying out the correction of the vehicle speed in the same way as the technique discussed above with reference to FIG. 4.

A detailed description will be given below with a view to illustrating how the vehicle position is corrected with a higher level of accuracy than the state-of-the-art practice in accordance with the first embodiment of the present invention even in the presence of only the measured values of the vehicle positions extracted by the autonomous navigation technique.

In the state-of-the-art vehicle position correction method, there are no facility polygon and no connecting road link L6. In an application shown in FIG. 6, accordingly, since there are no shapes, which serve as the references required for the correction of the vehicle position, in routes between the measured values P1 and P6 and between measured values P6' and P8', the vehicle positions with a cumulative amount of relative movement are outputted without correction and a locus of the vehicle positions is plotted by a dotted line. When the vehicle travels and arrives at the link L2, the measured value P9' is correlated with the link L2 which serves as the correcting shape, and the correction value Q9' is outputted. Alternatively, since the vehicle travel direction starting from the measured value P1 to the measured value P2 approximately coincides with the extending direction of the link L4, it may happen that the measured value P2 is corrected to a point on the link L4.

In actual practice, however, it is clear that the vehicle travels through 24 the facility polygon R1 to the link L2 via the connecting road link L6, and, therefore, even when the measured value P9 is corrected to the correction value Q9' on the link L2 in the state-of-the-art practice, the vehicle position tends to be largely dislocated from a target position.

To address this issue, by placing the facility polygon R1, the measured values P1 to P4 are bounded by the polygon R1 to allow the measured values by themselves to be outputted so far as the condition required by step S60 is satisfied, for thereby making it possible to avoid the measured values from being corrected on the other links.

Further, according to step S10, the measured values P5, P6, P7 are treated as the secondary vehicle positions in which the amount of relative travel is added to the previous correction value. Under this circumstance, in step S150, it is confirmed to find out whether the respective measured values have an approach relationship with the link L6 which serves as the entering and exit link for the polygon R1. Since, however, none of the measured values of the vehicle positions are provided with the correction points on the connecting road link L6 to which the respective legs of the vertical lines are drawn from the respective measured values, in steps S170 and S180, the points Q5, Q6, Q7, which intersect the contoured line segments of the polygon R1, are obtained as the correction values. Further, the measured value P8, which is obtained as the secondary vehicle position, is corrected to the correction point P8 on the entering and exit link (i.e. the connecting road link) L6 in steps S150 and S160.

Then, the operation returns from step S110 to step S70 and the measured value P9 is corrected to the correction point Q9 on the link L2 according to the state-of-the-art map matching operation. As a result, it is possible to correctly grasp a pertinent route from the facility area to a usual road via the connecting road.

To this end, the position correcting shape memory section 14 is arranged so as to store an external shape, as a position correcting shape composed of a closed regional shape, which represents a whole part of the relevant large area facility which the vehicle is enabled to enter, or a vehicle traversable range within the facility. With such arrangement, in the large area facility which the vehicle is enabled to enter or exit, it is possible for an exiting position of the vehicle position, encountered when the vehicle enters the relevant facility once and goes out of the relevant facility, to be accurately corrected, making it possible for the vehicle position, appearing after the vehicle has got out of the relevant facility, from being adversely affected with the error of the vehicle that would occur due to uncertain movements of the vehicle within the relevant facility.

In the present embodiment, the vehicle position calculation apparatus executes the map matching operation for correcting the vehicle position to allow the vehicle position, detected by a GPS receiver or the like, to be located onto the map route when the vehicle remains in a particular area such as a branch road and a car park, etc. This results in a capability of accurately correcting the vehicle position in accordance with an actual road state.

In addition, the vehicle position calculation apparatus stores position correcting shapes as respective correcting references for the vehicle position, with each of the position correcting shapes including a geometric shape composed of a group of line segments representing a center of the road and a two-dimensional closed regional shape associated with a predetermined location. With such a structure, the vehicle position calculation apparatus is enabled to select one of the position correcting shapes as a pertinent correcting reference, on the basis of a close proximity or inclusive relationship between a measured value of the vehicle position and the stored respective position correcting shapes, for correcting the vehicle position. When the line segment is selected as the correcting reference, the vehicle position is corrected so as to be aligned at a particular point of the selected line segment. In contrast, when the closed regional shape is selected as the correcting reference, the vehicle position is corrected so as to be aligned at another particular point inside or on a contoured line of the closed regional shape. This results further in a capability of accurately correcting the vehicle position in accordance with an actual road state.

Figure 7:
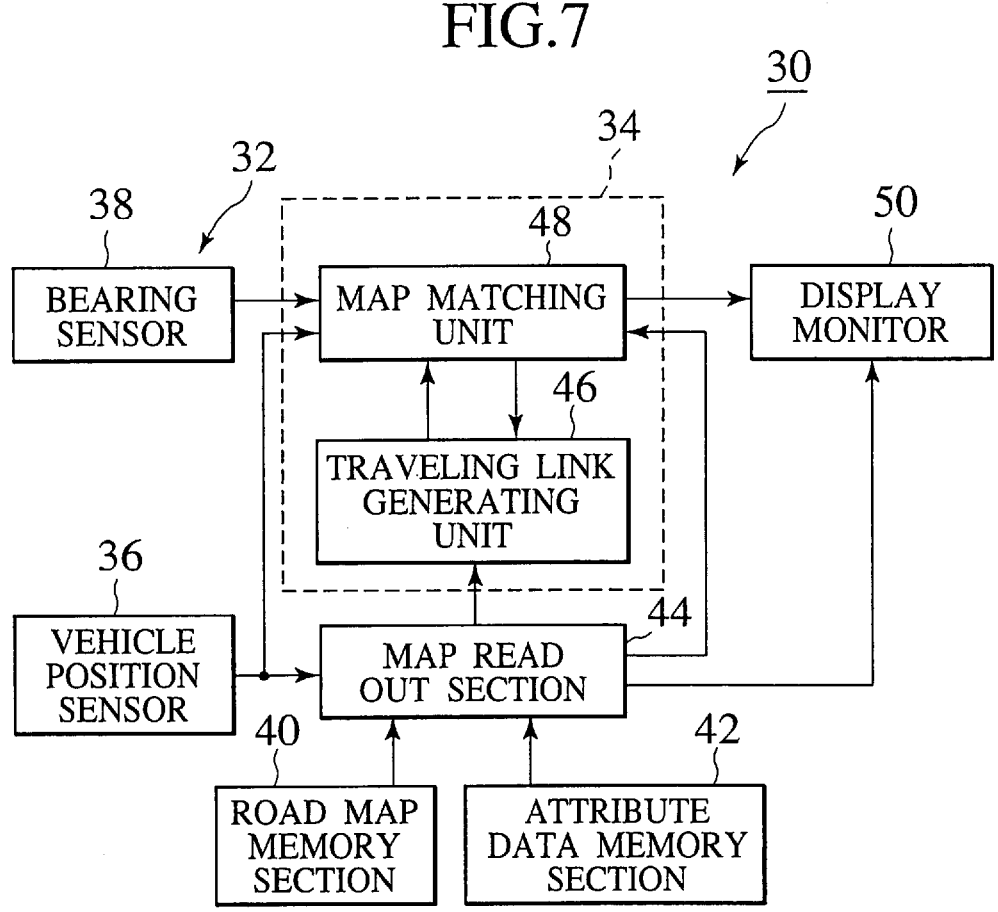
FIG. 7 is a block diagram of a vehicle position calculation apparatus of a second embodiment according to the present invention.

FIG. 7 is a block diagram of a vehicle position calculation apparatus of a second embodiment according to the present invention.

In the second embodiment shown in FIG. 7, the vehicle position calculation apparatus 30 includes a vehicle position measuring section 32 for providing vehicle state information, and a navigation controller 34 which serves as a vehicle position correcting section, a road map memory section 40, an attribute data memory section 42, and a map read out section 44 coupled to the road map memory section 40 and the attribute data memory section 42 to serve as a road shape data supply section for supplying road shape data including a closed regional shape correlated with a predetermined area of a map route.

The vehicle position measuring section 32 includes a vehicle position sensor 36 and a bearing sensor 38.

The vehicle position sensor 36 is constructed of, for example, a GPS receiver and an optical beacon receiver which detect a vehicle position represented with latitude and longitude. The vehicle position sensor 36 may further include a vehicle speed sensor and a gyro sensor which produce a vehicle speed signal and a bearing signal, based on which the latitude and the longitude of the vehicle position is corrected by employing a calculation and computation technique of the autonomous navigation system.

The bearing sensor 38 is constructed of, for example, a gyro sensor, a wheel-speed difference sensor and a steering sensor, etc. for detecting a vehicle travel direction to produce an output signal indicative thereof.

Figure 8:
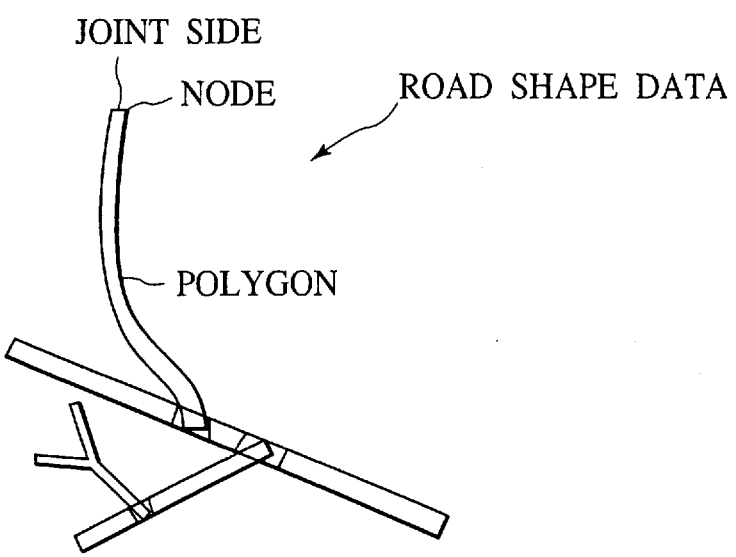
FIG. 8 is a schematic view representing the content of road shape data stored in a road map memory section of the vehicle position calculation apparatus shown in FIG. 7.

The road map memory section 40 stores road shape data composed of a large number of polygons each including a plurality of line segments and nodes to represent a road route in a plan view as in a house map of the related art. As viewed in FIG. 8, each polygon has a start point located at a certain point on the polygon and returns to the original after making one round. The polygon is left off at a change point of attributes such as intersecting points or road categories, and the leaving off point is referred to as a node. As seen in FIG. 8, since each polygon contains the node, neighboring polygons overlaps one another at a region including the node. In each polygon, further, sides at both edges of the polygon which are perpendicular to a running direction of the road is referred to as joint sides.

The attribute data memory section 42 stores road joint attribute data representing traffic regulating information, such as vehicle travel direction, etc. and joint state information correlated with the neighboring polygons, in association with road shape data correlated with a one-way/two-way road configuration or one-way traffic condition.

The map read out section 44 reads out road shape data and road joint attribute data, associated with the vicinity of the vehicle position, from the road map memory section 40 and the attribution data memory section 42, respectively, on the basis of vehicle state information obtained from the vehicle position sensor 36 of the vehicle position measuring section 32.

As shown in FIG. 7, the navigation controller 34 is constructed of a traveling link generating unit 46 connected to the map read out section 44, and a map matching unit 48 connected to the bearing sensor 38, the vehicle position sensor 36 and the traveling link generating unit 46.

The traveling link generation unit 46 generates a large number of traveling links which forms road segments, respectively, on the basis of map route information and joint state information mutually associated with the neighboring polygons contained in road joint attribute data read out from the map read out section 44. Also, the traveling link generation unit 46 includes a traveling link memory (not shown) to store the traveling links, for the vehicle, generated by the traveling link generation unit 46.

The map matching unit 48 serves to correct the measured vehicle position to locate a corrected vehicle position onto the traveling link generated by the traveling link generation unit 46, on the basis of vehicle state information composed of vehicle position information and bearing information delivered from the vehicle position sensor 36 and the bearing sensor 38, respectively, of the vehicle position measuring section 32, and traffic regulating information of road attribute data read out by the map read out section 44.

As shown in FIG. 7, the vehicle position calculation apparatus 30 further includes a display monitor 50, which serves as an actuation unit, for providing a display of map route information and the vehicle position by using road shape data stored in road map memory section 40 and the vehicle position determined by the map matching unit 48.

Also, the traveling link generation unit 46 and the map matching unit 48 are incorporated in a CPU which internally includes a ROM and a RAM, with the ROM storing a control program based on which the vehicle position calculation apparatus 30 is entirely controlled.

Figure 9:
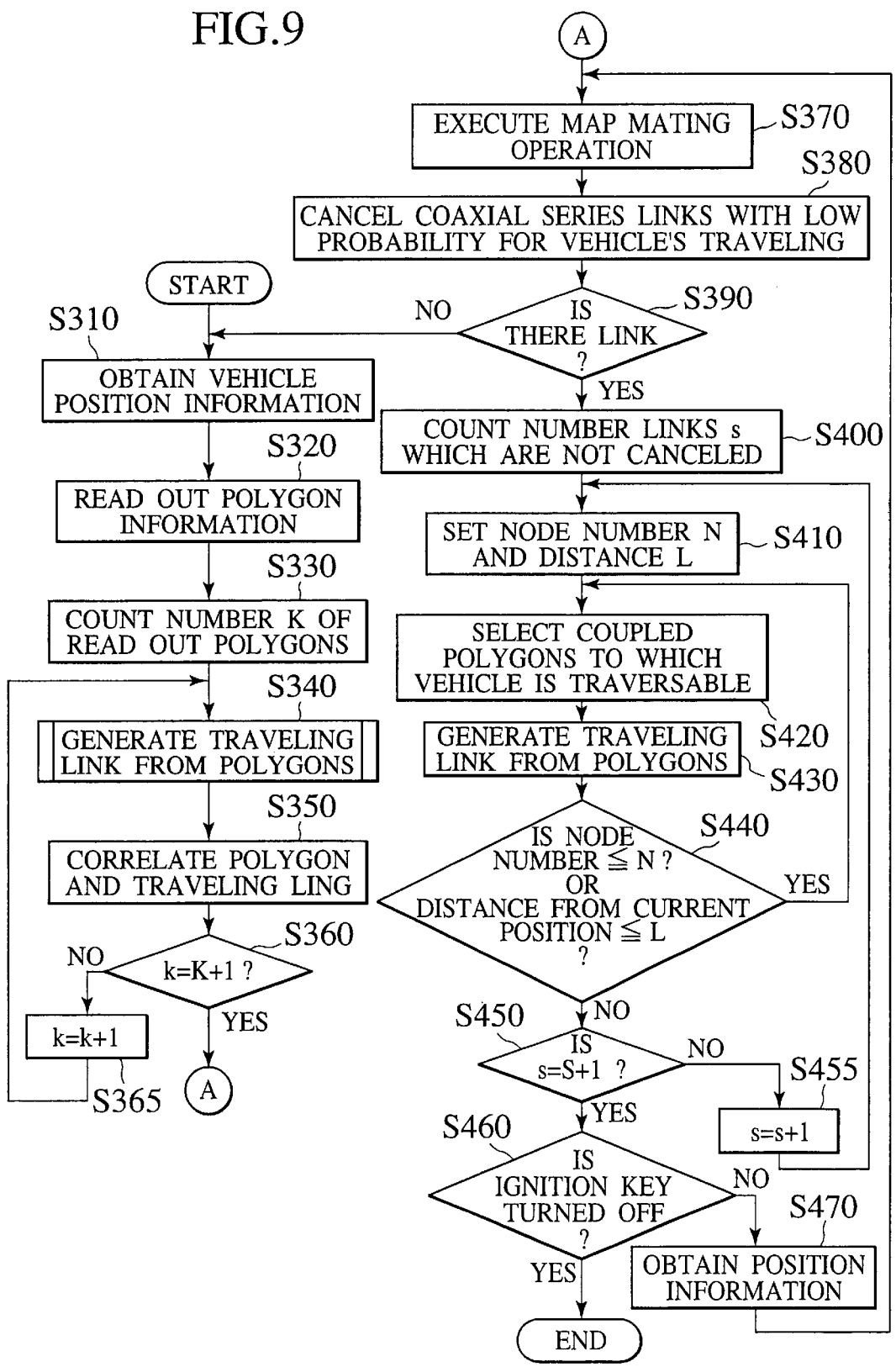
FIG. 9 is a flow chart illustrating the basic sequence of operational steps to be implemented by a traveling link generating unit and a map matching unit of the vehicle position calculation apparatus shown in FIG. 7 to carry out a vehicle position calculation method according to the present embodiment.
Figure 10:
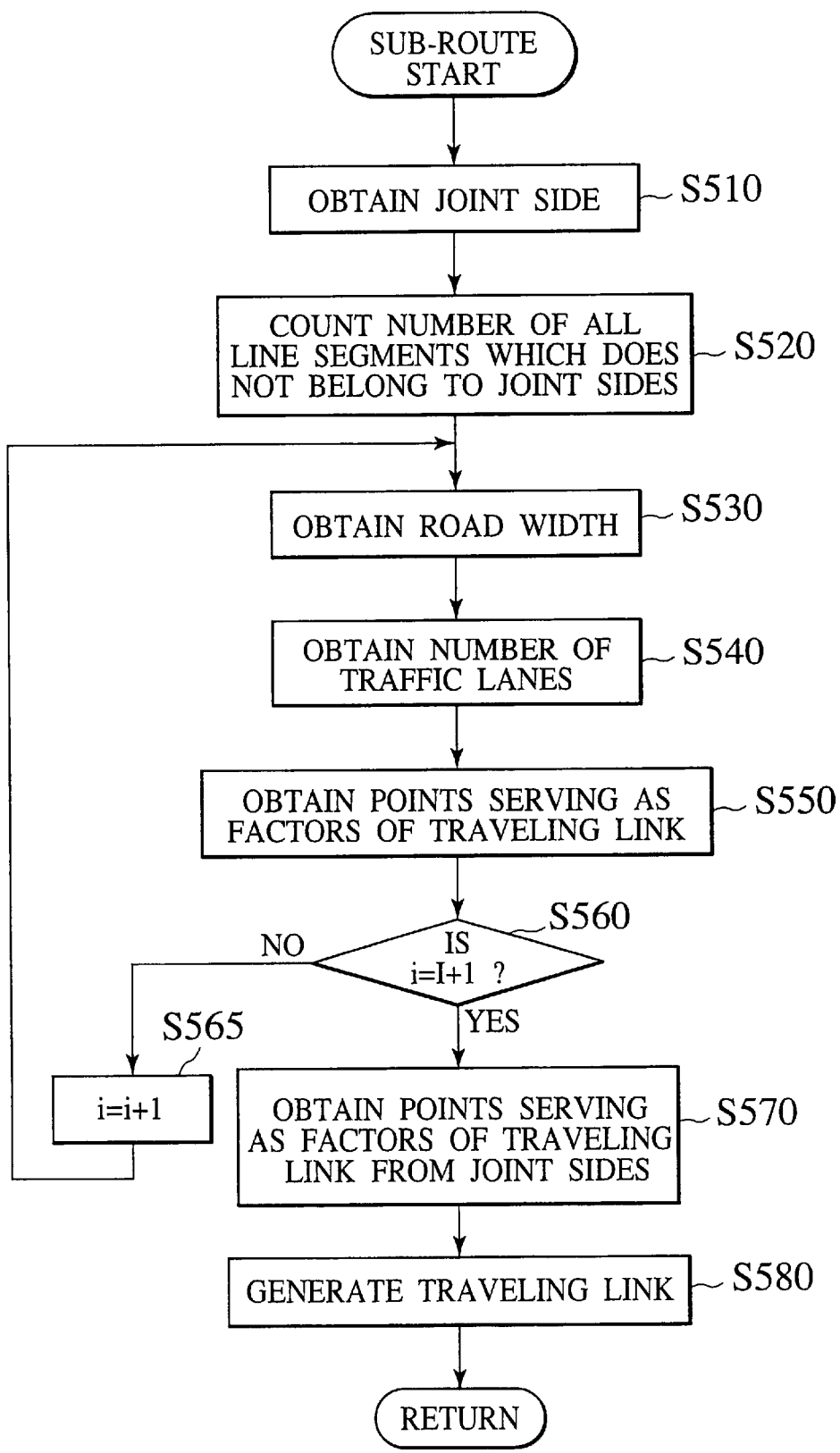
FIG. 10 is a flow chart illustrating the basic sequence of operational steps to be implemented by the traveling link generating unit of the vehicle position calculation apparatus shown in FIG. 7 to carry out the vehicle position calculation method according to the present embodiment.

FIG. 9 is a flow chart illustrating the basic sequence of operational steps to carry out a vehicle position calculation method in conjunction with the traveling link generating unit 46 and the map matching unit 48 of the vehicle position calculation apparatus 30 shown in FIG. 7. FIG. 10 is a flow chart illustrating a detail routine of operational steps to carry out the vehicle position calculation method in conjunction with the traveling link generating unit 46 of the vehicle position calculation apparatus 30. The control programs for the flow charts shown in FIGS. 9 and 10 are stored in the ROM of the CPU.

In step S310, vehicle position information is obtained from the vehicle position sensor 36.

In consecutive step S320, the traveling link generation unit 46 reads out polygon information, correlated with the vicinity of the vehicle position, and polygon joint state information from the map read out section 44. Then, in step S330, the number K of the polygons obtained in the above step is counted and initially settles a process number for an object to be processed in a loop as expressed as the process number k=1.

Now, referring to the flow diagram of the routine shown in FIG. 10, a detailed description is given to the basic sequence of operation of the traveling link generating unit 46 in conjunction with step S340.

In step S510 shown in FIG. 10, the traveling link generating unit 46 extracts the joint side to be connected to other polygon from a plurality of polygons obtained from the map read out section 44.

Figure 11:
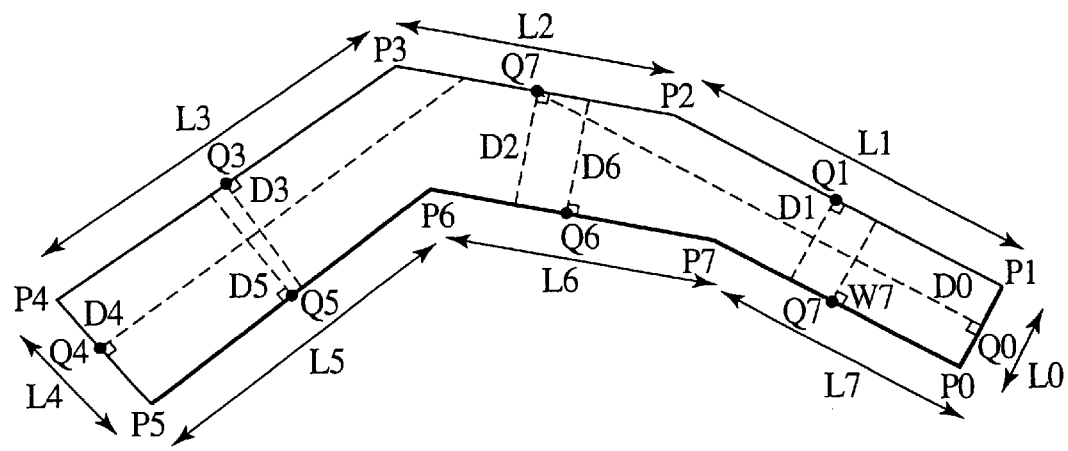
FIG. 11 is a schematic view of a method illustrating how joint sides of the polygon are extracted according to the present embodiment.

An extracting process for extracting the joint sides of the polygon is described below in detail with reference to FIG. 11.

First, a line segment L1 is defined between neighboring two points, which form the polygons, in a manner which is discussed below. As shown in FIG. 11, a linear line is drawn so as to intersect an intermediate point Qi of each line segment Li. It is assumed that the linear line extends through an internal part of the polygon for a distance Di at which the linear line intersects a line segment which constitutes another polygon. In such a manner, the distance Di for each line segment Li is obtained.

Further, among the three neighboring line segments, if first distances Di between respective both distal ends are substantially equal to one another and a second distance Di at the intermediate point is extremely different from the first distance, for example, as shown in formulae expressed as:

$$Di-1 \approx Di+1 \quad (6)$$

$$Di >> Di-1 \quad (7)$$

wherein the intermediate line segment Li is regarded as the joint side. In FIG. 11, the line segments L0 and L4 become the joint sides, respectively.

In step S520 of FIG. 10, since steps S530 to 550 are implemented for the points which are not bound by the joint sides of the polygons, the number I of pieces of all the points which are not bound by the joint sides of the polygons to be processed, while setting the process number as the process Number I=1 for the loop to be processed.

Figure 12:
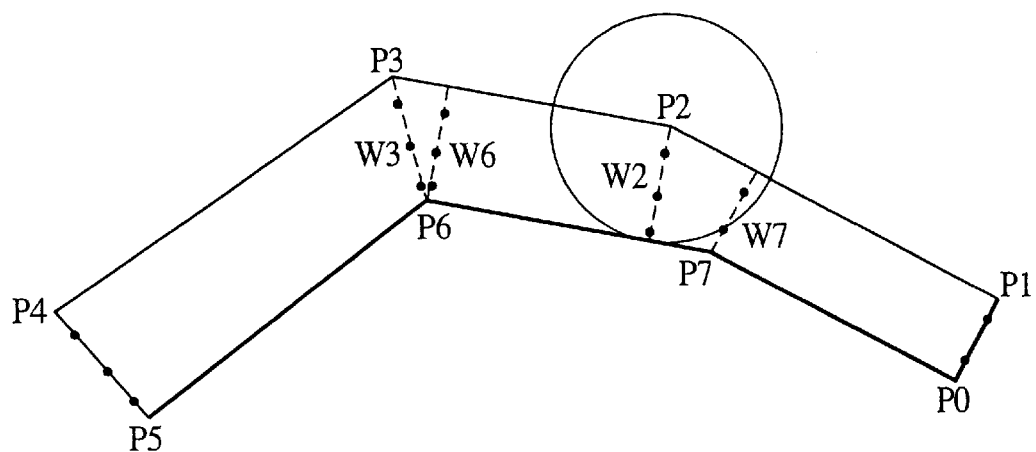
FIG. 12 is a schematic view illustrating how a width of the road is obtained according to the present embodiment.

In step S530, the road width Wi at each point pi is obtained. As shown in FIG. 12, the road width Wi originates from the point pi, passes inside the polygon and the line segment intersecting the polygon in the shortest time period to find out the line segment which is designated at wi.

In step S540, the number ni of traffic lanes is obtained by using the road width Wi obtained in step 530. Assuming that each traffic lanes has a width, for example, in a range about 3.5 m, the number ni of the traffic lanes is expressed by a formula:

$$ni = Wi/3.5 \quad (8)$$

The value obtained in the above formula (8) is rounded to the nearest larger whole number to obtain the number of traffic lanes.

In step S550, points serving as factors for the traveling link are obtained from the road width Wi and the number ni of the traffic lanes ni. An estimated width wi of the traffic lane is obtained from the road width Wi and the number ni of the traffic lanes is obtained in a formula which is expressed as:

$$wi = Wi/ni \quad (9)$$

Further, a factor of the traveling link is defined as a point, from the point Pi, existing on a position represented in the following formula:

$$wi/2 + wi \times m (0 \leq m < ni) \quad (10)$$

Further, the operation goes to step S560 to discriminate whether the process number i reaches a predetermined value expressed in a formula i=I+1 or is below the predetermined value. In a case where the process number i does not meat a condition i=I+1, the operation goes to step S565, and a new process number i is defined as a result of adding the number 1 to the process number i, while repeatedly executing the steps subsequent to step S530.

When the process number i reaches a value of I+1, the operation goes to step S570. Upon consideration in that the width of the joint side corresponds to a road width, step S570 is executed in the same manner as steps S540 and 550, thereby obtaining the point which becomes the factor of the traveling link.

Figure 13:
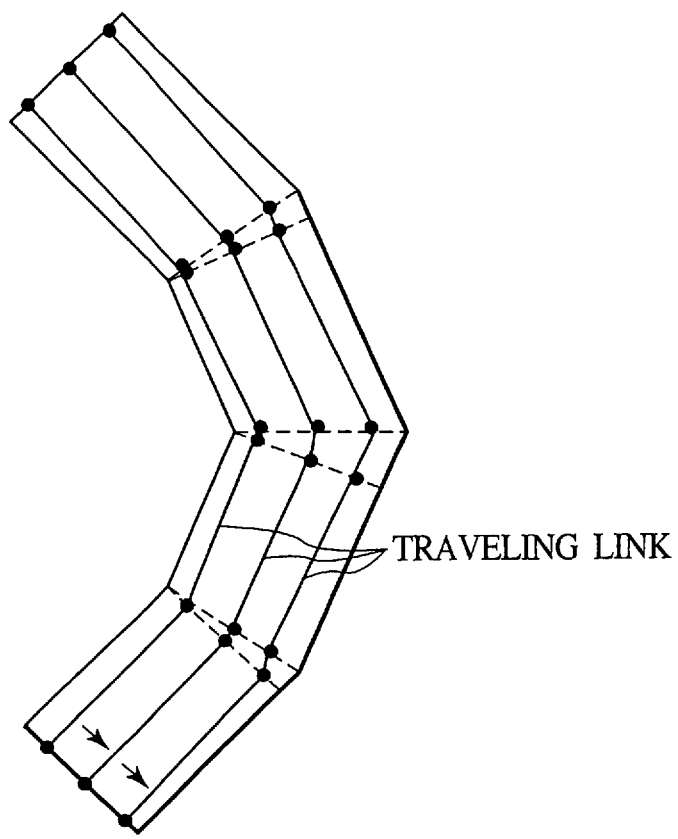
FIG. 13 is a schematic view illustrating how the traveling link is generated for a road having the same number of traffic lanes according to the present embodiment.
Figure 14:
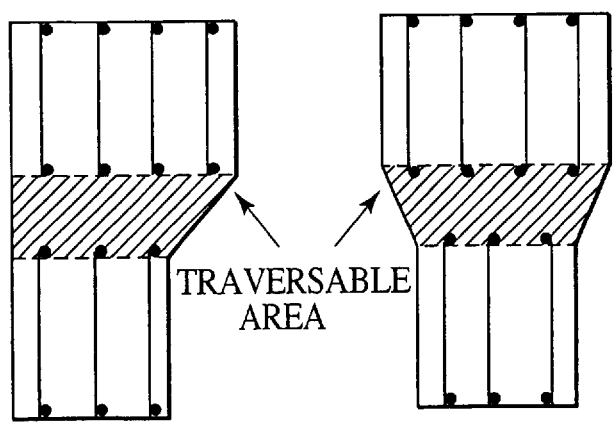
FIG. 14 is a schematic view illustrating how the traveling link is generated for a road having different number of traffic lanes according to the present embodiment.

In step S580, further, the traveling link is generated on the basis of the points extracted in steps S520 and 570. In FIG. 13, more particularly, when the number of traffic lanes is equal to one another, the traveling links are coupled from the leftmost side in sequence. As shown in FIG. 14, also, in a case where the number S of traffic lanes varies, the traveling links are not positively coupled, while obtaining an area in which the vehicle position is not corrected in the map matching operation. This results in that the measured vehicle position by itself is used as corrected one. Of course, in such a case, only when the vehicle position is dislocated, the vehicle position may be corrected.

Turning back to FIG. 9, in step S350, the polygons thus obtained are correlated with the traveling links generated in step S340.

Then, in step S360, it is discriminated whether the process number k reaches the value of k=K+1. In a case where the process number k does not reach the value of K+1, the operation goes to step S365 to render the result, in which the process number k is added with 1, to be a new process number k, and steps subsequent to step S340 are repeatedly implemented.

In contrast, in a case where the process number k reaches the value of K+1, the operation goes to step S370. In this instance, the map matching unit 48 executes the map matching operation by using the traveling links generated in step S340. That is, the map matching unit 48 corrects the vehicle position in alignment with the traveling link, generated by the traveling link generating unit 46, on the basis of vehicle position information detected by the vehicle position sensor 36, bearing information detected by the bearing sensor 38 and traffic regulating information of joint attribute data readout by the map read out section 44.

In step S380, further, the traveling link generating unit 46 responds to the result of the map matching operation in step S370 and conducts search for a most probable traveling link associated with the vehicle position, and a series of traveling links connected to the most probable traveling link. These traveling links involve the link associated with the vehicle position or interactive with the road in which there is a possibility for the vehicle to travel. Further, the traveling link generating unit 46 cancels the least probable link, i.e. the link which is not correlated with the vehicle position or which has no possibility for the vehicle to travel.

In step S390, it is judged whether the relevant links exist after the canceling operation in step S380. In a case where all the links are cancelled in step S380, the operation goes to step S310. In contrast, when the relevant links exist, the operation goes to step S400.

In step 400, further, the traveling link generating unit 46 counts the number S of the relevant links which are not cancelled in step S380 and initially settles the process number s=1 as the object to be executed for the loop processing.

In step S410, also, the traveling link generating unit 46 settles a reference number N which serves as a reference of the number of the nodes for designating the link, which is relatively closer to the vehicle position, as the traveling link, and a reference distance L which serves as a reference of distance from the vehicle position.

In step S420, a search is conducted to find out joint state information from a polygon including a link having the current process number to other polygons, and coupled polygons to which the vehicle is traversable are selected.

In step S430, a traveling link is generated by using the coupled polygons selected in step S420.

In step S440, further, a calculation is performed on the basis of the number of the nodes of the traveling link which is generated, and the distance from the vehicle position in the following formulas:

$$\text{Number of nodes} \leq N \tag{11}$$

$$\text{Distance from vehicle position} \leq L \tag{12}$$

When both the formulas (11), (12) satisfy, the operation returns to step S420 to repeat the operations discussed above.

In step S440, in contrast, when either one of the above formulas (11), (12) fails to satisfy, that is, when the number of nodes of the traveling link which is generated is greater than N or when the distance from the vehicle position is greater than L, the operation goes to step S450.

In step S450, it is discriminated whether the process number s has satisfied the formula s=S+1. When the process number s has failed to satisfy the value of S+1, the operation goes to step S455 to render the result, in which the process number s is added with 1, to be a new process number s, and steps subsequent to step S410 are repeatedly implemented.

On the contrary, in a case where the process number s reaches the value of S+1, the operation goes to step S460. In step S460, a search is conducted whether an ignition key is turned off or remains turned on.

When the ignition key was turned off, the operation is terminated. When the ignition key is not turned off and the driving condition of the vehicle is continued, in step S470, the vehicle position sensor 36 detects the vehicle position to provide vehicle position information. Upon receipt of this vehicle position information, the map matching unit 48 repeatedly executes the steps starting from step S370 to step S460.

In the present embodiment, the vehicle position calculation apparatus executes the map matching operation for correcting the vehicle position to allow the vehicle position, detected by a GPS receiver or the like, to be located onto the map route when the vehicle remains in a particular area such as an intersecting area at the road with a large width, etc. This results in a capability of accurately correcting the vehicle position in accordance with an actual road state.

Also, in such a manner discussed above, the map read out section stores road shape data composed of the polygons representing the road, and traffic regulating information corresponding to road shape data and joint attribute data representing joint conditions among mutual road shape data. Upon receipt of detected vehicle position information, the map read out section reads out road shape data and joint attribute data in the vicinity of the vehicle position. Upon receipt of detected vehicle position information and detected bearing information, the traveling link generating unit generates the traveling link of the current vehicle position on the basis of road shape data and joint attribute data which are read out. Upon receipt of detected vehicle position information and detected bearing information, further, the map matching unit corrects the vehicle position on the traveling link which is generated by the traveling link generating unit such that even when the vehicle turns to the right or the left at the corner, the vehicle position is accurately corrected.

Still also, the presence of the traveling link correlated with the vehicle position and stored in the link generating unit allows the stored traveling link to be read out again for use in a subsequent traveling state of the vehicle, with a resultant decrease in the amount of calculation related to the steps for generating the links.

Figure 15:
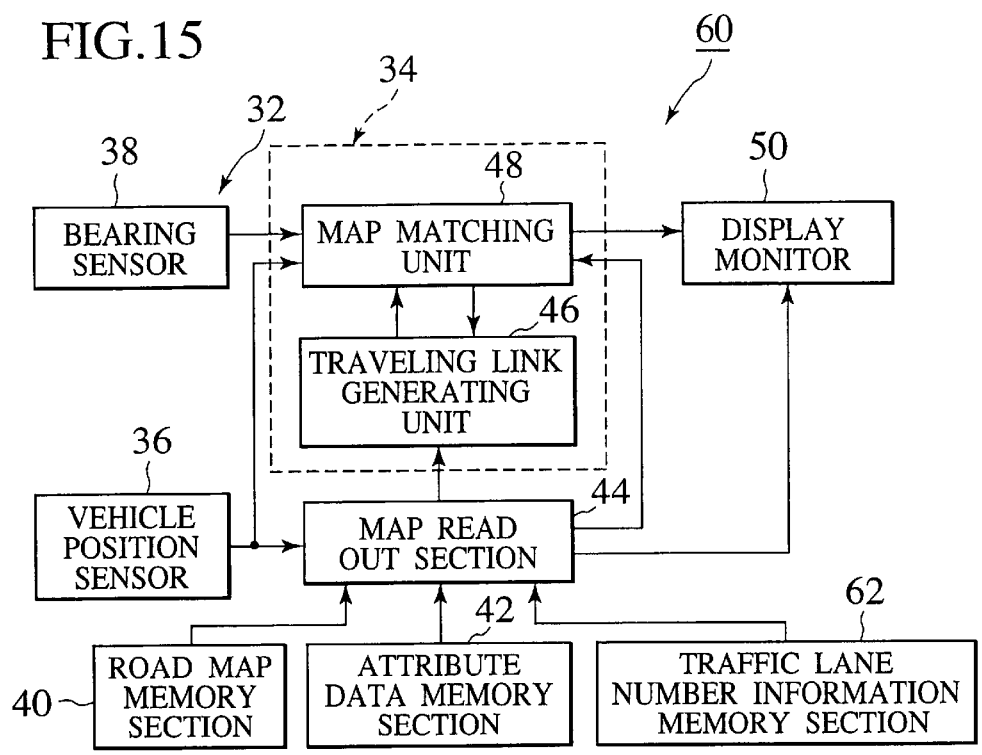
FIG. 15 is a block diagram of a vehicle position calculation apparatus of a third embodiment according to the present invention.

FIG. 15 is a block diagram of a vehicle position calculation apparatus of a third embodiment according to the present invention, with like parts bearing the same reference numerals as those used in FIG. 7 with a view to omitting redundant detailed description.

In the third embodiment, the vehicle position calculation apparatus, generally designated at 60, is identical in structure with the vehicle speed calculation apparatus 30 of the second embodiment shown in FIG. 7 except for a traffic lane number information memory section 62 which is connected to the map read out section 44. The traffic lane number information memory section 62 serves to store traffic lane number information of the road.

The traveling link generating unit 46 and the map matching unit 48 of the vehicle position calculation apparatus 60 of the third embodiment will be described below in detail with reference to the flow charts of FIGS. 9 and 10 as in the second embodiment.

In the third embodiment, the step S540 shown in FIG. 10 is replaced with step for obtaining a traffic lane number ni from traffic lane number information stored in the traffic lane number information memory section 62.

With the third embodiment discussed above, the vehicle position calculation apparatus executes the map matching operation for correcting the vehicle position to allow the vehicle position, detected by a GPS receiver or the like, to be located onto the map route when the vehicle remains in a particular area such as an intersecting area at the road with a large width, etc. This results in a capability of accurately correcting the vehicle position in accordance with an actual road state.

Also, in the present embodiment, the traffic lane number information memory section which stores traffic lane number information of the road is stored, and the traffic lane number information of a region in the vicinity of the vehicle position is read out on the basis of the detected vehicle position. By using the read out traffic lane number information, the traveling link of the current vehicle position is generated in a more accurate manner.

As a consequence, even when the vehicle turns to the left or the right at the corner, it is possible for the vehicle position calculation apparatus to encounter an overshooting or undershooting that would otherwise occur in the related art practice. Also, the presence of the link, necessary for a given relevant part, which is generated on the basis of road shape data preliminarily prepared for a display, allows the amount of data to be stored from being reduced.

Figure 16:
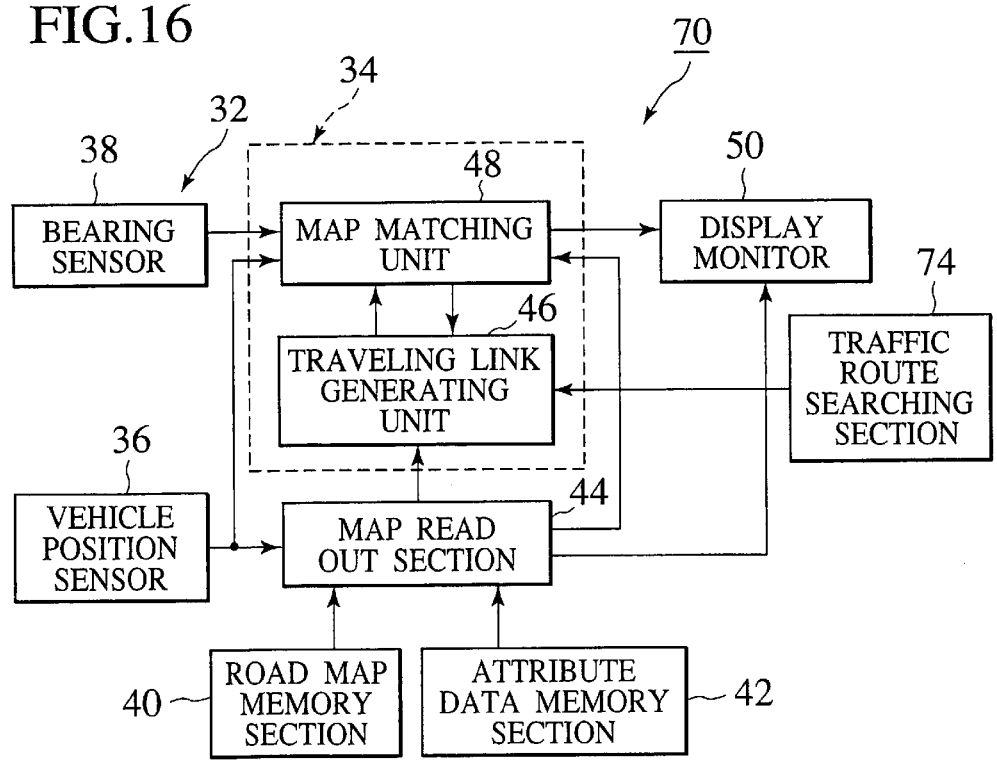
FIG. 16 is a block diagram of a vehicle position calculation apparatus of a fourth embodiment according to the present invention.

FIG. 16 is a block diagram of a vehicle position calculation apparatus of a fourth embodiment according to the present invention, with like parts bearing the same reference numerals as those used in FIG. 7 with a view to omitting redundant detailed description.

In the fourth embodiment, the vehicle position calculation apparatus, generally designated at 70, is identical in structure with the vehicle speed calculation apparatus 30 of the second embodiment shown in FIG. 7 except for a traffic route searching section 74 which is connected to the traveling link generating unit 46. The traffic route searching section 74 serves to conduct a search for the traffic route which the vehicle travels to a destination. In particular, the traffic route searching section 74 conducts the search for the traffic route to the destination from the vehicle position on the basis of vehicle position information and bearing information detected by the vehicle position sensor 36 and the bearing sensor 38, respectively, by using, for example, so-called Dijkstra's method.

The traveling link generating unit 46 and the map matching unit 48 of the vehicle position calculation apparatus 60 of the fourth embodiment will be described below in detail with reference to the flow charts of FIGS. 9 and 10 as in the second embodiment.

In the second embodiment, although the step S420 shown in FIG. 9 selects traversable joint polygons, in the fourth embodiment, a polygon which is traversable and remains on the traffic lane is selected.

Figure 17:
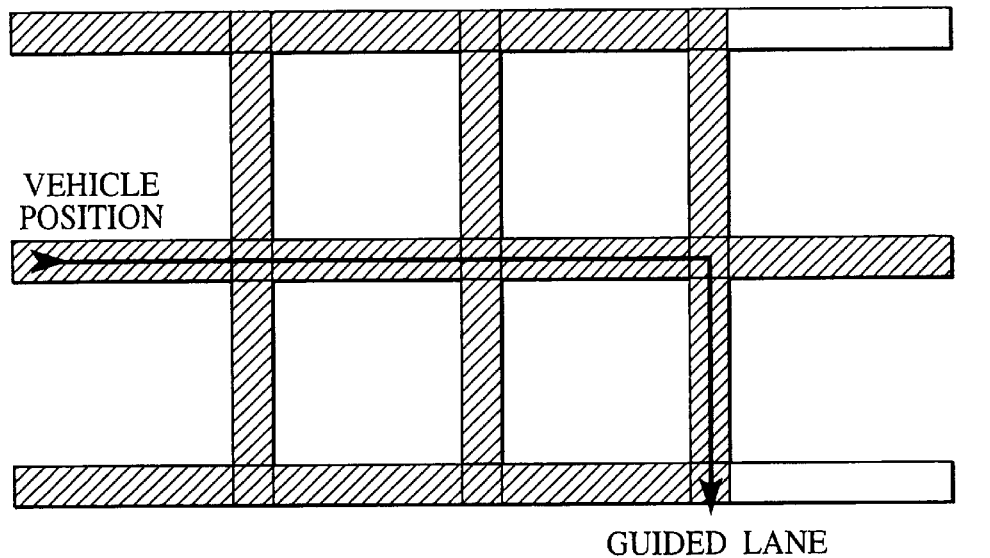
FIG. 17 is a schematic view illustrating the road shape formed in a lattice configuration according to the present embodiment.

When the traveling link is generated so as to have nodes up to five pieces, for example as shown in FIG. 17, the traveling link must be generated nearly with polygons (here, 16 sheets of polygons) in a region where the road shape is formed in a lattice configuration.

However, in a case where the traveling link generating unit 46 serves to generate the traveling link by using only the polygons lying on the road route searched with the road route searching section 74, the traveling link is satisfied with four sheets of polygons involving the polygon associated with the vehicle position in FIG. 17.

With such an arrangement, in addition to the second and third embodiments, the search is conducted for the road route to the destination to allow the traveling link, associated with the vehicle position, to be generated on the road route which has been searched. This enables the traveling link to be newly prepared only when the vehicle position is dislocated from the road route, with a resultant decrease in the amount of calculation to be needed.

Figure 18:
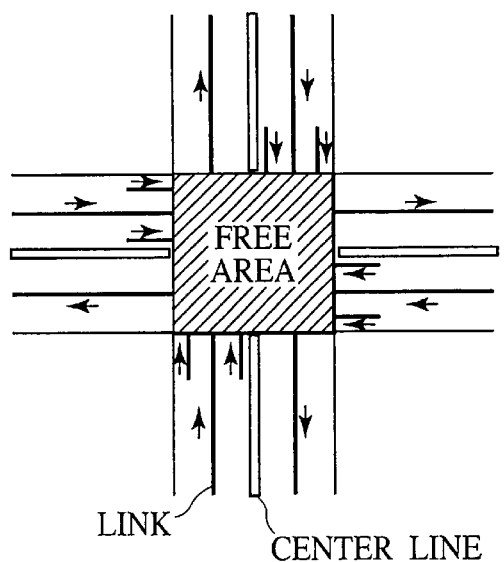
FIG. 18 is a schematic view illustrating how the traveling links are generated in respective directions at a two-way road with a relatively large width according to the second to fourth embodiments.
Figure 19:
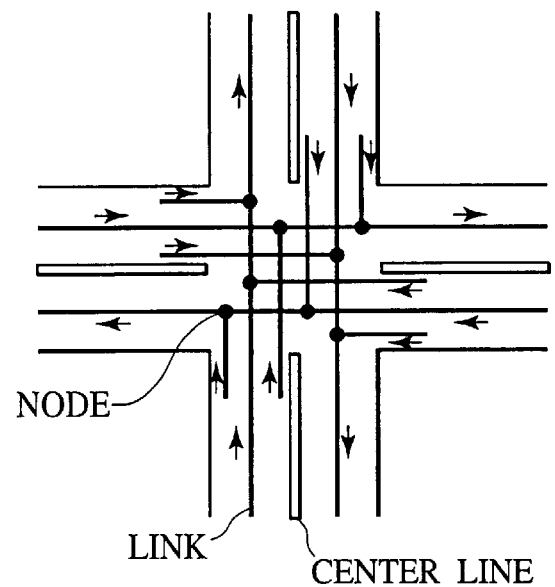
FIG. 19 is a schematic view illustrating how left side lane and right side lane are added as traveling links when the vehicle enters an intersecting area of the road route according to the second to fourth embodiments.

Now, especially concerning the second to fourth embodiments, a detailed description is given for a method of generating links to be used for map matching operation based on polygon data, with reference to FIGS. 18 and 19.

First, as shown in FIG. 18, the links are generated for respective directions on the two-way road with a relatively large width (of more than 5.5 m). Further, as shown in FIG. 19, in a case where the vehicle enters an intersecting point, links for a leftmost side lane and a rightmost side lane are added. In such a case, the links are interconnected to one another to form a one-way.

Then, especially concerning the second to fourth embodiments, a measure for overshooting or undershooting is described below in detail with reference to FIGS. 20 and 21.

Figure 20:
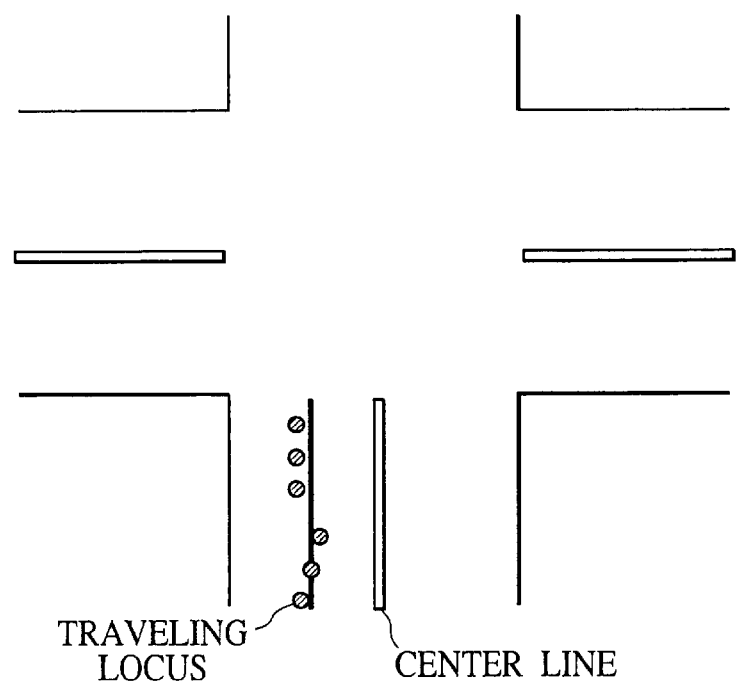
FIG. 20 is a schematic view illustrating how a map matching operation is performed on the basis of a reference of a line which divides a space between a center line of the road and a left side of the road into two equaled road components according to the second to fourth embodiments.

As seen in FIG. 20, first, the map matching operation is carried out for a vehicle traveling locus with reference to a bisected line between the center of the road and the leftmost side thereof.

Figure 21:
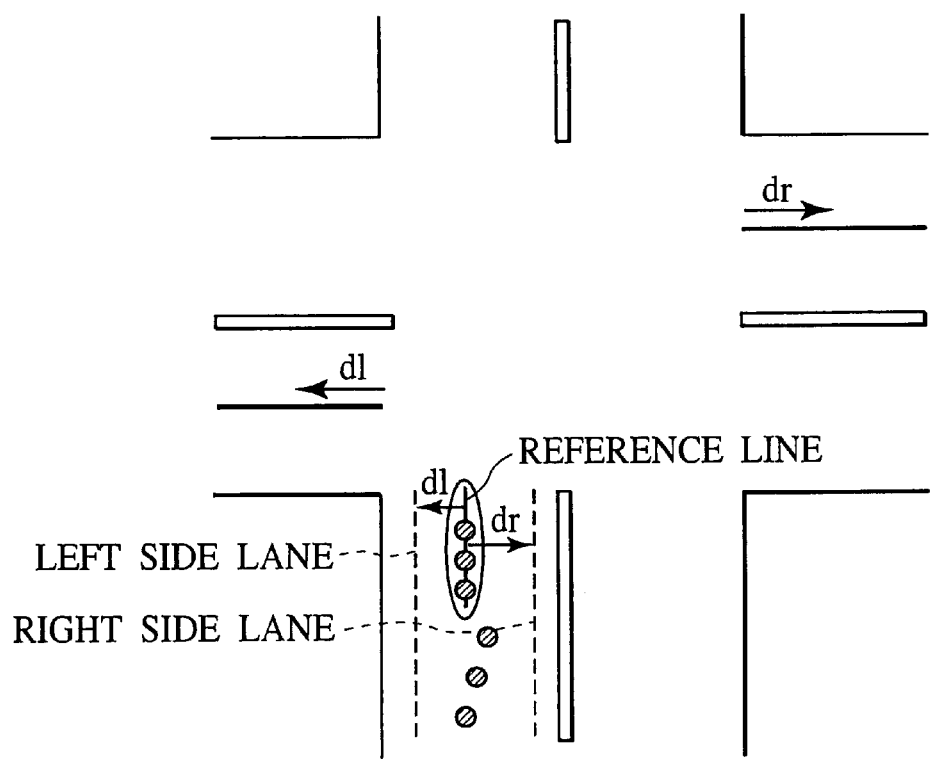
FIG. 21 is a schematic view illustrating how an overshooting or undershooting phenomenon is prevented during correction of the vehicle position according to the second to fourth embodiments.
Figure 22:
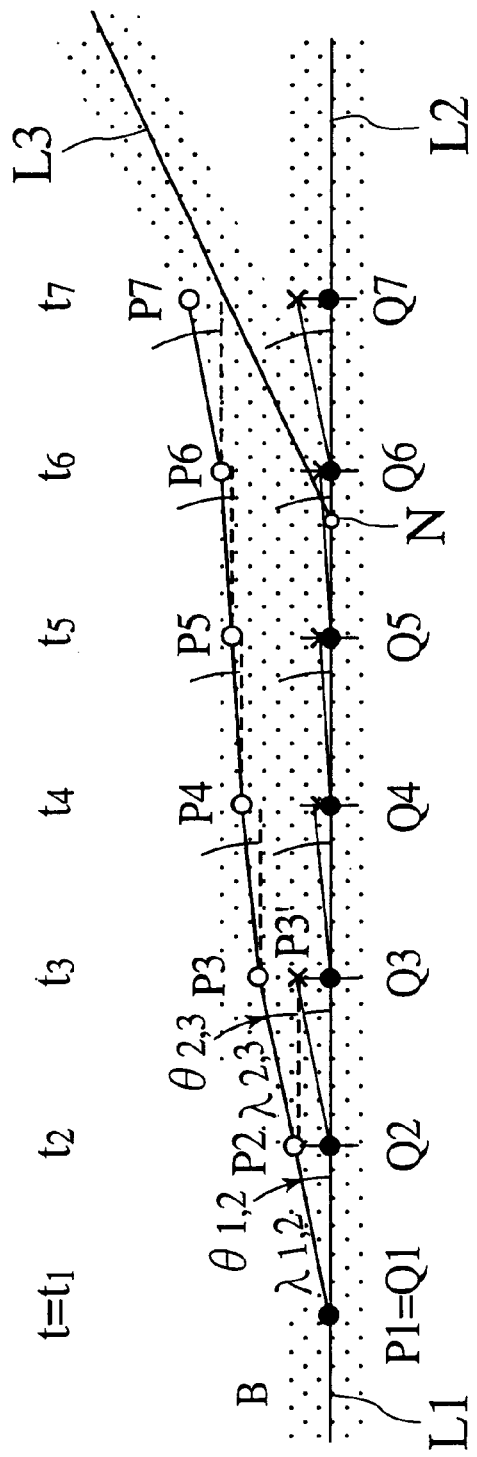
FIG. 22 is a schematic view illustrating how the vehicle position is corrected at a branch road with a vehicle position calculation apparatus in a first related art.
Figure 23:
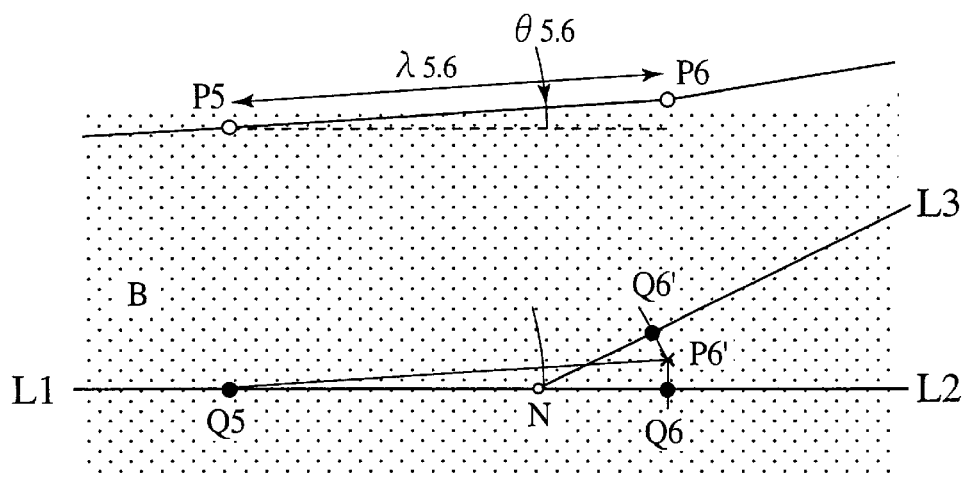
FIG. 23 is a schematic view illustrating how the vehicle position is corrected at a branch road with a vehicle position calculation apparatus in the first related art.
Figure 24A:
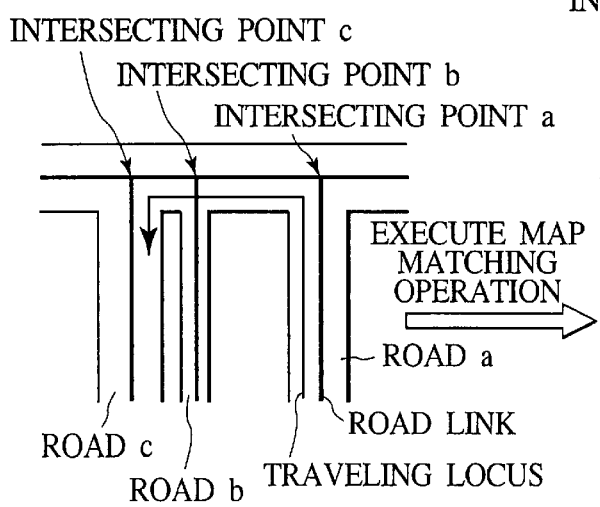
FIG. 24A is a schematic view illustrating how the vehicle turns to the left at an intersecting point c at a second time immediately after the vehicle has turned to the left at an intersecting point a in a second related art.
Figure 24B:
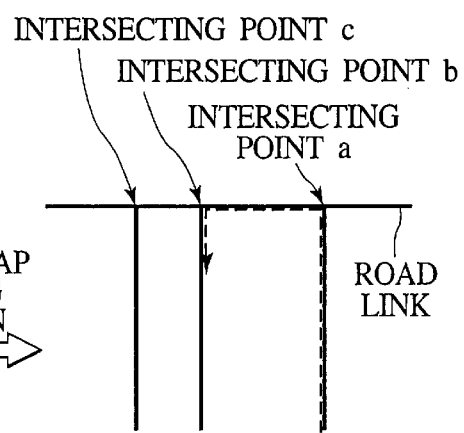
FIG. 24B is a schematic view illustrating how the undershooting phenomenon is generated in the vehicle position calculation apparatus in the second related art.

As shown in FIG. 21, further, in a case where the vehicle tends to turn to the left, correction of the vehicle position is implemented prior to the operation to be turned to the left such that the vehicle position is advanced by a distance dl based on the assumption in that the vehicle has been traveling on the center of the leftmost side lane.

On the contrary, when the vehicle tends to turn to the right, correction of the vehicle position is implemented prior to the operation to be turned to the right such that the vehicle position is advanced by a distance dr based on the assumption in that the vehicle has been traveling on the center of the rightmost side lane.

It is to be noted that the position of the reference line for obtaining the distances dl, dr shown in FIG. 21 is obtained in an approximate linear line based on the method of the least squares with respect to the traveling locus lying on several points prior to a time instant before the vehicle turns to the right.

The entire content of a Patent Application No. TOKUGAN 2000-368857 with a filing date of Dec. 4, 2000 in Japan and that of a Patent Application No. TOKUGAN 2000-364745 with a filing date of Nov. 30, 2000 in Japan are both hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle position calculation apparatus comprising:
   a vehicle position measuring section measuring a vehicle position;
   a position correcting shape memory section storing road shape data including position correction shapes composed of a group of line segments representing a center of a road and a two-dimensional closed regional shape correlated with a predetermined location on a map; and
   a vehicle position correcting section correcting the vehicle position on the map to be in alignment with a point on corresponding one of the position correction shapes stored in the position correcting shape memory section,
   wherein the vehicle position correcting section includes:
      a correction reference determination unit determining whether to correct the vehicle position based on a reference of any one of the position correcting shapes stored in the position correcting shape memory section, on the basis of a close proximity or inclusive relationship between the vehicle position and the any one of the position correcting shapes;

a line segment conformity position correcting unit correcting the vehicle position so as to allow the vehicle position to be aligned onto a point of the line segment which the correction reference determination unit determines as the reference; and a regional conformity position correcting unit correcting the vehicle position so as to allow the vehicle position to be aligned onto a point inside the closed regional shape or on a point of a contoured line segment of the closed regional shape which the correction reference determination unit determines as the reference.

2. A vehicle position calculation apparatus according to claim 1, wherein when a corrected value, which is corrected at a given time instant, of the vehicle position lies inside the closed regional shape, which the correction reference determination unit determines as the reference, or lies on a contoured line segment thereof and when a measured value, which is obtained at a subsequent given time instant, of the vehicle position remains outside the closed regional shape, the correction reference determination unit determines to use the line segment as the reference for correction of the vehicle position on the basis of a close proximity relationship between enter and exit line segments correlated with the closed regional shape and the vehicle position.

3. A vehicle position calculation apparatus according to claim 2, wherein the correction reference determination unit determines to use the closed regional shape as the reference for correcting the vehicle position when none of the enter and exit line segments remains in the vicinity of the vehicle position.

4. A vehicle position calculation apparatus according to claim 1, wherein the position correcting shape memory section stores the position correcting shapes to include the closed regional shape composed of an outer shape of a road with respect to a vicinity of nodes in which more than three roads connect with each other as a connection area.

5. A vehicle position calculation apparatus according to claim 1, wherein the position correcting shape memory section stores the position correcting shapes to include the closed regional shape composed of an outer shape of a sinuous road with a large radius of curvature.

6. A vehicle position calculation apparatus according to claim 1, wherein the position correcting shape memory section stores the position correcting shapes to include an outer shape of a large area facility to which a vehicle is able to enter or an outer shape representing a vehicle traversable range of the large area facility, and line segments which interconnects the outer shape of the large area facility or that representing the vehicle traversable range and existing road segments.

7. A vehicle position calculation apparatus according to claim 1, wherein the vehicle position correcting section includes a measured value reliability determination unit which determines a degree of reliability of a measured value of the vehicle position outputted from the vehicle position measuring section.

8. A vehicle position calculation apparatus according to claim 7, wherein the correction reference determination unit determines to correct the vehicle position based on a reference of the line segment regardless of the closed regional shape when the degree of reliability determined by the measured value reliability determination unit is below a predetermined level.

9. A vehicle position calculation apparatus according to claim 7, wherein the measured value reliability determination unit evaluates degrees of a plurality of reliabilities to select a most reliable measured value of the vehicle position as an object to be corrected.

10. A vehicle position calculation apparatus comprising:

a vehicle position measuring section measuring position information representing a vehicle position and bearing information representing a vehicle travel direction;

a road map memory section storing road shape data composed of polygons correlated with a road on a map;

an attribute data memory section storing joint attribute data representing traffic regulating information with respect to the road shape data and a joint state information between the road shape data;

a map read out section reading out the road shape data in a vicinity of the vehicle position and the joint attribute data from the map read out memory section and the attribute data memory section, respectively, on the basis of the position information;

a traveling link generating unit generating a traveling link correlated with the vehicle position in response to the road shape data and the joint attribute data read out by the map read out section, on the basis of the position information and the bearing information; and a vehicle position correcting section responsive to the position information and the bearing information to correct the vehicle position on the map onto the traveling link generated by the traveling link generating unit.

11. A vehicle position calculation apparatus according to claim 10, wherein the traveling link generating unit extracts the number of traffic lanes from the road shape data read out by the map read out section and generates the traveling link correlated with the vehicle position by using the number of traffic lanes.

12. A vehicle position calculation apparatus according to claim 10, further comprising a traffic lane number information memory section storing traffic lane number information of the road, wherein the map read out section reads out the traffic lane number information of a region in the vicinity of the vehicle position from the traffic lane number information memory section on the basis of the position information, and wherein the traveling link generating unit generates the traveling link by using the traffic lane number information read out by the map read out section.

13. A vehicle position calculation apparatus according to claim 10, further comprising a traffic route searching section conducting a search for a traffic route to a destination, wherein the traveling link generating unit generates the traveling link associated with the traffic route searched by the traffic route searching section.

14. A vehicle position calculation apparatus according to claim 10, wherein the traveling link generating unit stores the traveling link generated by the traveling link generating unit.

* * * * *